United States Patent
Nagashima et al.

(10) Patent No.: US 8,197,066 B2
(45) Date of Patent: Jun. 12, 2012

(54) IMAGE DISPLAY APPARATUS

(75) Inventors: Kenji Nagashima, Daito (JP); Atsuhiko Chikaoka, Daito (JP); Seiji Takemoto, Daito (JP); Hiroki Matsubara, Daito (JP); Yutaka Takahashi, Daito (JP); Ken Nishioka, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 652 days.

(21) Appl. No.: 12/269,487

(22) Filed: Nov. 12, 2008

(65) Prior Publication Data

US 2009/0128717 A1    May 21, 2009

(30) Foreign Application Priority Data

Nov. 15, 2007   (JP) .................. 2007-297009

(51) Int. Cl.
*G03B 21/14* (2006.01)

(52) U.S. Cl. ............... 353/20; 353/10; 353/30; 353/31; 353/33; 353/34; 353/37; 353/81; 353/84; 353/98; 353/99; 372/42; 372/68; 372/50.121

(58) Field of Classification Search ............ 353/10, 353/20, 30, 31, 33, 34, 37, 81, 84, 98, 99, 353/122; 372/42, 50.121, 68; 359/1, 25, 359/27, 35, 503, 640, 569, 566, 574, 196.1–226.3; 369/112.16, 112.05; 348/44, 41, 40, 4, 51, 348/54, 88

See application file for complete search history.

(56) References Cited

U.S. PATENT DOCUMENTS

| | | | |
|---|---|---|---|
| 4,943,155 A * | 7/1990 | Cross, Jr. ...................... 353/33 |
| 5,534,950 A * | 7/1996 | Hargis et al. .................. 348/758 |
| 6,034,818 A * | 3/2000 | Sedlmayr ...................... 359/283 |
| 6,144,683 A * | 11/2000 | Floyd ......................... 372/50.12 |
| 6,183,092 B1 * | 2/2001 | Troyer ........................... 353/31 |
| 6,409,349 B1 * | 6/2002 | O'Connor ....................... 353/31 |
| 6,424,412 B1 | 7/2002 | Matthews |
| 6,870,650 B2 * | 3/2005 | Kappel et al. ................... 359/15 |
| 6,909,529 B2 * | 6/2005 | Curtis ............................. 359/30 |
| 7,009,928 B2 * | 3/2006 | Jutte et al. ................ 369/112.05 |
| 7,705,907 B2 * | 4/2010 | Iwane .......................... 348/341 |
| 2003/0206248 A1 | 11/2003 | Childers |
| 2004/0196877 A1 | 10/2004 | Kawakami et al. |

(Continued)

FOREIGN PATENT DOCUMENTS

CN    1820220 A    8/2006

(Continued)

OTHER PUBLICATIONS

Partial European Search Report for related application No. 08019700.7, dated Dec. 21, 2010, 6 pages.

(Continued)

*Primary Examiner* — Georgia Y Epps
*Assistant Examiner* — Sultan Chowdhury
(74) *Attorney, Agent, or Firm* — Osha Liang LLP

(57) ABSTRACT

A laser projector includes a green laser, a two-wavelength laser, a PBS, a collimator lens, a two-axis galvanometer mirror, a group of lenses, and a screen. The green laser emits a green laser beam. The two-wavelength laser emits red and blue laser beams. The PBS is provided at the position where respective optical paths of laser beams emitted from respective lasers cross each other to cause these optical paths to coincide with each other.

13 Claims, 18 Drawing Sheets

U.S. PATENT DOCUMENTS

| | | | |
|---|---|---|---|
| 2005/0094104 A1* | 5/2005 | Ishizaka et al. | 353/20 |
| 2005/0169153 A1* | 8/2005 | Ogasawara et al. | 369/112.16 |
| 2006/0092814 A1* | 5/2006 | Jeong et al. | 369/112.02 |
| 2006/0138239 A1 | 6/2006 | Sonoda et al. | |
| 2006/0197914 A1* | 9/2006 | Robinson | 353/20 |
| 2006/0238660 A1 | 10/2006 | Takeda | |
| 2007/0071049 A1 | 3/2007 | Kohara et al. | |
| 2007/0098324 A1 | 5/2007 | Kitamura et al. | |
| 2007/0229668 A1 | 10/2007 | He et al. | |
| 2008/0101199 A1* | 5/2008 | Yamasaki et al. | 369/112.1 |
| 2008/0170285 A1 | 7/2008 | Kasazumi et al. | |

FOREIGN PATENT DOCUMENTS

| | | |
|---|---|---|
| EP | 1 720 057 A1 | 11/2006 |
| JP | 5-291659 | 11/1993 |
| JP | 9-152640 | 6/1997 |
| JP | 10253905 A | 9/1998 |
| JP | 2000-194302 | 7/2000 |
| JP | 2003-021800 | 1/2003 |
| JP | 2004507751 A | 3/2004 |
| JP | 2004-219480 | 8/2004 |
| JP | 2004304111 A | 10/2004 |
| JP | 2004-341210 | 12/2004 |
| JP | 2005203011 A | 7/2005 |
| JP | 2005242036 A | 9/2005 |
| JP | 2005259268 A | 9/2005 |
| JP | 2005294279 A | 10/2005 |
| JP | 2006-154032 | 6/2006 |
| JP | 2006184663 A | 7/2006 |
| JP | 2006184770 A | 7/2006 |
| JP | 2006323354 A | 11/2006 |
| JP | 2007-3687 | 1/2007 |
| JP | 2007080988 A | 3/2007 |
| JP | 207212485 A | 8/2007 |
| WO | 02/18870 A1 | 3/2002 |

OTHER PUBLICATIONS

Patent Abstracts of Japan for Japanese Publication No. 05-291659, Publication date Nov. 5, 1993 (1 page).
Patent Abstracts of Japan for Japanese Publication No. 2000-194302, Publication date Jul. 14, 2000 (1 page).
Patent Abstracts of Japan for Japanese Publication No. 2007-003687, Publication date Jan. 11, 2007 (1 page).
Patent Abstracts of Japan for Japanese Publication No. 2004-341210, Publication date Dec. 2, 2004 (1 page).
Patent Abstracts of Japan for Japanese Publication No. 09-152640, Publication date Jun. 10, 1997 (1 page).
Patent Abstracts of Japan for Japanese Publication No. 2004-219480, Publication date Aug. 5, 2004 (1 page).
Shiozawa et al., "Monolithic Integrated Two-Wavelength Laser Diode for DVD-ROM/CD-ROM," Toshiba Review, vol. 55, No. 8, pp. 66-69 (2000) (4 pages).
Patent Abstracts of Japan for Japanese Publication No. 2006-154032, Publication date Jun. 15, 2006 (1 page).
Patent Abstracts of Japan for Japanese Publication No. 2003-021800, Publication date Jan. 24, 2003 (1 page).
Extended European Search Report for Application No. 08019700.7 dated Jul. 28, 2011 (15 pages).
Office Action for Chinese Application No. 200810176188.X mailed Sep. 23, 2011, with English translation thereof (22 pages).
Patent Abstract for Chinese Publication No. 1820220 Published Aug. 16, 2006 (1 page).
Office Action for Japanese Application No. 297009/2007 mailed Feb. 21, 2012, with English translation thereof (8 pages).
espacenet, Patent Abstract for Japanese Publication No. 2006-323354 Published Nov. 30, 2006 (1 page).
espacenet, Patent Abstract for Japanese Publication No. 2004-507751 Published Mar. 11, 2004 (1 page).
espacenet, Patent Abstract for Japanse Publication No. 2006-184663 Published Jul. 13, 2006 (1 page).
espacenet, Patent Abstract for Japanese Publication No. 2005-203011 Published Jul. 28, 2005 (1 page).
espacenet, Patent Abstract for Japanese Publication No. 2007-080988 Published Mar. 29, 2007 (1 page).
espacenet, Patent Abstract for Japanese Publication No. 2004-304111 Published Oct. 28, 2004 (1 page).

* cited by examiner

EMISSION-POINT SPACING

IMAGE DISPLAY APPARATUS

BACKGROUND OF THE INVENTION

1. Field of the Invention

The present invention relates to an image display apparatus for displaying an image by applying a laser beam to a projection surface.

2. Description of the Background Art

<Full-Color Laser Projector>

In order to reproduce full colors by a so-called laser projector that displays an image by applying a laser beam to a projection surface such as screen or wall, it is necessary to prepare laser beams with the three primary colors of red, green and blue.

For example, Japanese Patent Laying-Open No. 2003-021800 discloses a projection-type display apparatus scanning light beams from three independent light sources toward a projection surface and splitting the light beams between pixels while scanning the beams so that the light beams are radiated as pulsed beams.

Japanese Patent Laying-Open Nos. 2004-219480 and 2006-154032 also disclose respective display apparatuses using laser beams of three colors. In the display apparatuses disclosed in these documents each, three independent light sources are used for generating laser beams of three colors.

Further, Japanese Patent Laying-Open No. 09-152640 discloses a laser apparatus converting wavelengths of a laser beam from a single laser by three wavelength-converters to generate laser beams of three colors. The laser apparatus cannot emit the laser beams of three colors at exactly the same time. Therefore, the laser apparatus includes a wavelength-converter holding plate where the three wavelength-converters are arranged on the same circumference, and a rotating drive unit rotating the wavelength-converter holding plate, so that the human eyes recognize the light of three colors in synthesized state.

Respective apparatuses disclosed in Japanese Patent Laying-Open Nos. 2003-021800, 2004-219480 and 2006-154032 each require many components and many adjustments for obtaining three-color laser beams. This will be described with reference to FIG. 1. FIG. 1 is a diagram for illustrating an optical system for obtaining three-color laser beams in the conventional technique (hereinafter referred to as conventional optical system).

As shown in FIG. 1, the conventional optical system includes a blue laser 102, a red laser 104, a green laser 106, a first PBS (Polarized Beam Splitter) 109, a second PBS 110, a collimator lens 112, a two-axis galvanometer mirror 114, a group of lenses 116, and a screen 118. Further, green laser 106 includes an infrared laser 107 and a second-harmonic generation (SHG) element 108.

Here, the following description also applies to an apparatus using, instead of the above-described elements, other elements having similar functions. For example, the following description applies as well to an apparatus using a green laser configured differently from the above-described one.

Blue laser 102, red laser 104 and green laser 106 emit laser beams of blue, red and green respectively. First PBS 109 causes respective optical paths of the red laser beam and the green laser beam to coincide with each other. Second PBS 110 causes respective optical paths of the light emitted from first PBS 109 and the blue laser beam to coincide with each other. Collimator lens 112 converges the light emitted from second PBS 110 and makes the light parallel. Two-axis galvanometer mirror 114 scans the light passed through collimator lens 112. The group of lenses 116 focuses the light reflected from galvanometer mirror 114 on screen 118. Screen 118 is a projection surface for the laser beam.

As seen from the above, the conventional optical system requires many components such as the three lasers and the two PBSs used for causing respective optical paths of the beams from respective lasers to coincide with each other. Accordingly, the projector is large in size. Further, because of the use of the two PBSs, the transmission rate of the laser beam lowers and the light quantity decreases. Furthermore, it is necessary to adjust many elements for causing laser beams to coincide with each other.

In the case where the laser apparatus disclosed in Japanese Patent Laying-Open No. 09-152640 is used instead of the three lasers, the PBS is unnecessary. This method, however, requires the wavelength-converter holding plate and the rotating drive unit and thus also requires many components.

<Detection of Scan Abnormality>

In an apparatus displaying an image by applying a laser beam to a projection surface such as screen, namely so-called laser projector, if an abnormality occurs in scanning of the laser beam, the laser beam of a high energy density is continuously applied to a certain point on the screen, which is dangerous. Depending on the case, the danger could be posed to any person around the apparatus.

Some techniques for avoiding such a danger have been proposed. For example, a laser projector disclosed in Japanese Patent Laying-Open No. 2004-341210 applies infrared light to a galvanometer mirror used as a scan element, and detects the reflected light thereof by a plurality of light-receiving elements provided along the outer periphery of the screen. Then, the laser projector analyzes the state of scanning from the detected state, and stops applying a laser beam when an abnormality in scanning is found.

Further, an image display apparatus disclosed in Japanese Patent Laying-Open No. 2007-003687 is provided with a light-receiving unit in an overscan area of a surface to be scanned. When a light beam is scanned on the surface to be scanned, the image display apparatus determines whether or not a signal from the light-receiving unit is output at a certain time interval, and controls emission of the light beam according to the result of the determination.

Further, a projection display apparatus disclosed in Japanese Patent Laying-Open No. 2000-194302 monitors the scan timing of an actually emitted laser beam by a main scan beam sensor provided near a main scan polygon mirror. When the timing is abnormal, the projection display apparatus turns off the laser.

The apparatuses disclosed in above-referenced Japanese Patent Laying-Open Nos. 2004-341210 and 2007-003687 each find an abnormality in scanning, from a signal provided from the light-receiving means provided on the outer periphery of the screen. The apparatus disclosed in Japanese Patent Laying-Open No. 2000-194302 detects an abnormality in scanning by detecting the reflected light from the main scan polygon mirror. The apparatuses, however, cannot monitor the state of scanning all the time. Therefore, a long time could pass from the time when an abnormality actually occurs to the time when the abnormality is detected. Further, the precision in detection of an abnormality of these apparatuses is low.

<Collimation of Laser Beam>

For an apparatus displaying an image by applying a laser beam to a projection surface such as screen, namely so-called laser projector, it is necessary that a laser beam emitted from a laser is parallel light with a very small diameter.

A collimator lens is an element often used for obtaining parallel light. For example, Japanese Patent Laying-Open No. 2003-021800 discloses a projection-type display apparatus including a collimator lens.

Further, a laser beam correction mechanism for obtaining parallel light is disclosed in Japanese Patent Laying-Open No. 05-291659. The laser beam correction mechanism includes two beam imaging units and an image processing unit. The two beam imaging units are respectively provided at two positions apart from each other on a track of a laser, and the imaging units output respective beam projection images at their positions. The image processing unit processes respective image signals obtained by the two beam imaging units, and outputs a signal for controlling the positions of mirrors and lenses.

The above-described method using the collimator lens, however, cannot always obtain parallel light due to a change in condition such as temperature.

Further, the laser beam correction mechanism disclosed in Japanese Patent Laying-Open No. 05-291659 is large in scale due to the requirement of two beam imaging units for example.

SUMMARY OF THE INVENTION

The present invention has been made for solving the problems above, and a main object of the present invention is to provide an image display apparatus including a smaller number of components as compared with the conventional image display apparatuses or having a reduced number of elements to be adjusted.

According to an aspect of the present invention, an image display apparatus for displaying an image on a projection surface by applying laser beams of three colors to the projection surface can be provided. The image display apparatus includes: a single-wavelength laser emitting a laser beam of one color of the three colors; a two-wavelength laser having laser elements respectively emitting laser beams of two colors of the three colors, the laser elements being contained in a single package; a synthesizing element causing an optical path of the laser beam of one color and respective optical paths of the laser beams of two colors to coincide with each other; and a scan device selectively applying the laser beams of three colors transmitted through the synthesizing element to the projection surface pixel by pixel of the image.

Preferably, the image display apparatus further includes correction unit for correcting color displacement on the projection surface.

Still preferably, the correction unit includes a hologram element correcting displacement between respective optical paths of the laser beams of two colors due to a difference in light emission point of the two-wavelength laser.

Still preferably, the correction unit includes a control unit controlling timing of emission of the laser beams of three colors such that the color displacement is corrected.

Still preferably, the image display apparatus further includes a detector detecting an amount of the color displacement. The control unit controls timing of emission of the laser beams of three colors based on the amount of the color displacement detected by the detector.

Preferably, the two-wavelength laser emits a red laser beam and a blue laser beam, and the single-wavelength laser emits a green laser beam.

Still preferably, the single-wavelength laser includes: an infrared laser emitting an infrared laser beam; and a second-harmonic generation element converting the infrared laser beam emitted from the infrared laser into the green laser beam.

Preferably, the synthesizing element is a polarized beam splitter provided at a position where the optical path of the laser beam of one color and respective optical paths of the laser beams of two colors cross each other.

Preferably, the scan device includes a scan element for applying the laser beams of three colors transmitted through the synthesizing element to the projection surface pixel by pixel.

Still preferably, the scan element is a two-axis galvanometer mirror.

According to another aspect of the present invention, an image display apparatus for displaying an image on a projection surface by applying laser beams of three colors to the projection surface can be provided. The image display apparatus includes: a laser source emitting the laser beams of three colors; a synthesizing element causing respective optical paths of the laser beams of three colors to coincide with each other; a scan device selectively applying the laser beams of three colors transmitted through the synthesizing element to the projection surface pixel by pixel of the image; and a control unit controlling timing of emission of the laser beams of three colors by the laser source for correcting color displacement on the projection surface.

Preferably, the image display apparatus further includes a detection unit detecting an amount of the color displacement. The control unit controls timing of emission of the laser beams of three colors based on the amount of the color displacement detected by the detection unit.

Preferably, the laser source includes: a single-wavelength laser emitting a laser beam of one color of the three colors; and a two-wavelength laser having laser elements respectively emitting laser beams of two colors of the three colors, the laser elements being contained in a single package.

The laser projector according to the present invention includes a two-wavelength laser. Therefore, the laser projector can have a reduced number of components as compared with conventional laser projectors.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
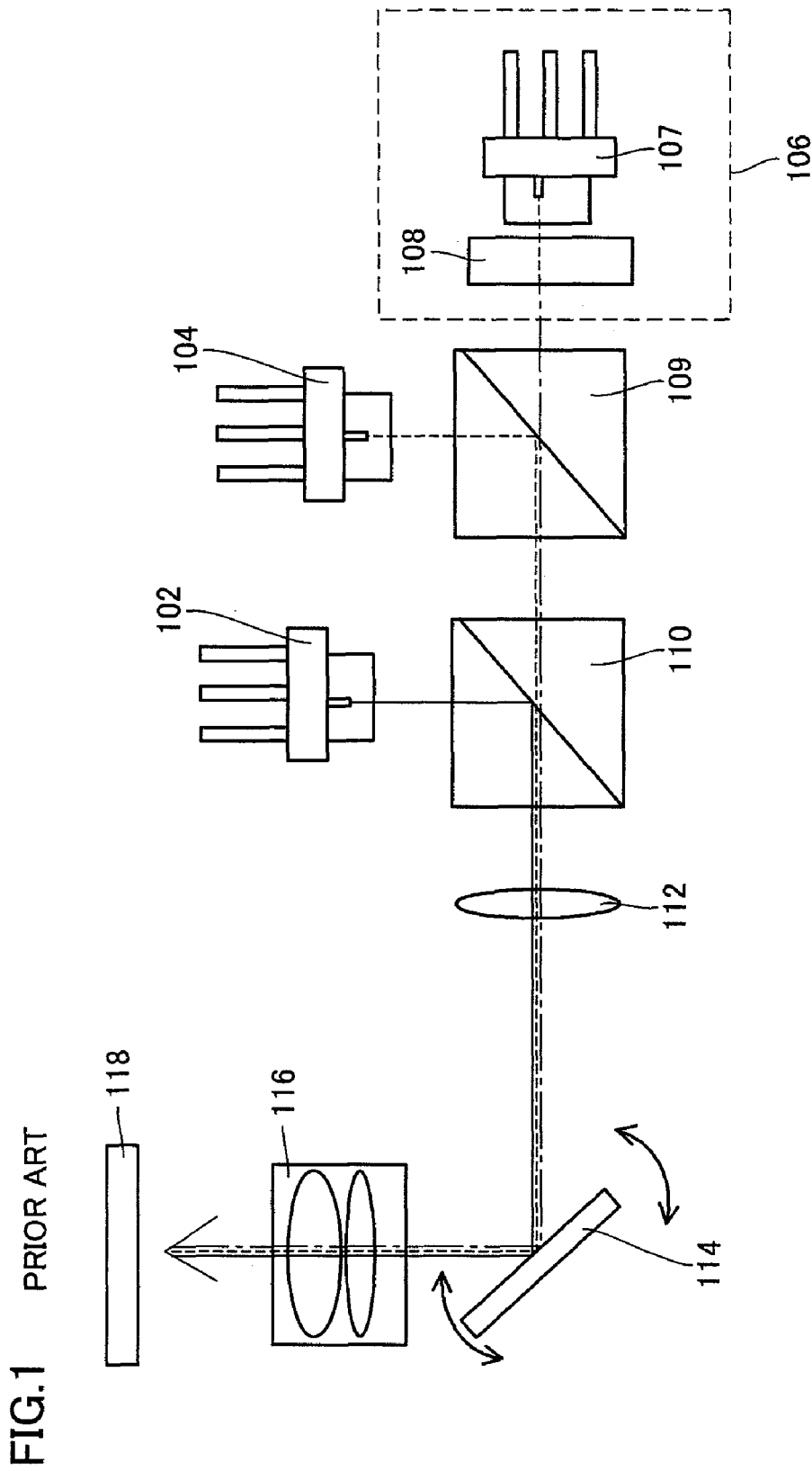
FIG. 1 is a diagram illustrating a conventional optical system.

In the following, embodiments of the present invention will be described with reference to the drawings. In the following description, like components are denoted by like reference characters. They are named identically and function identically. Therefore, a detailed description thereof will not be repeated.

[First Embodiment]

Figure 2:
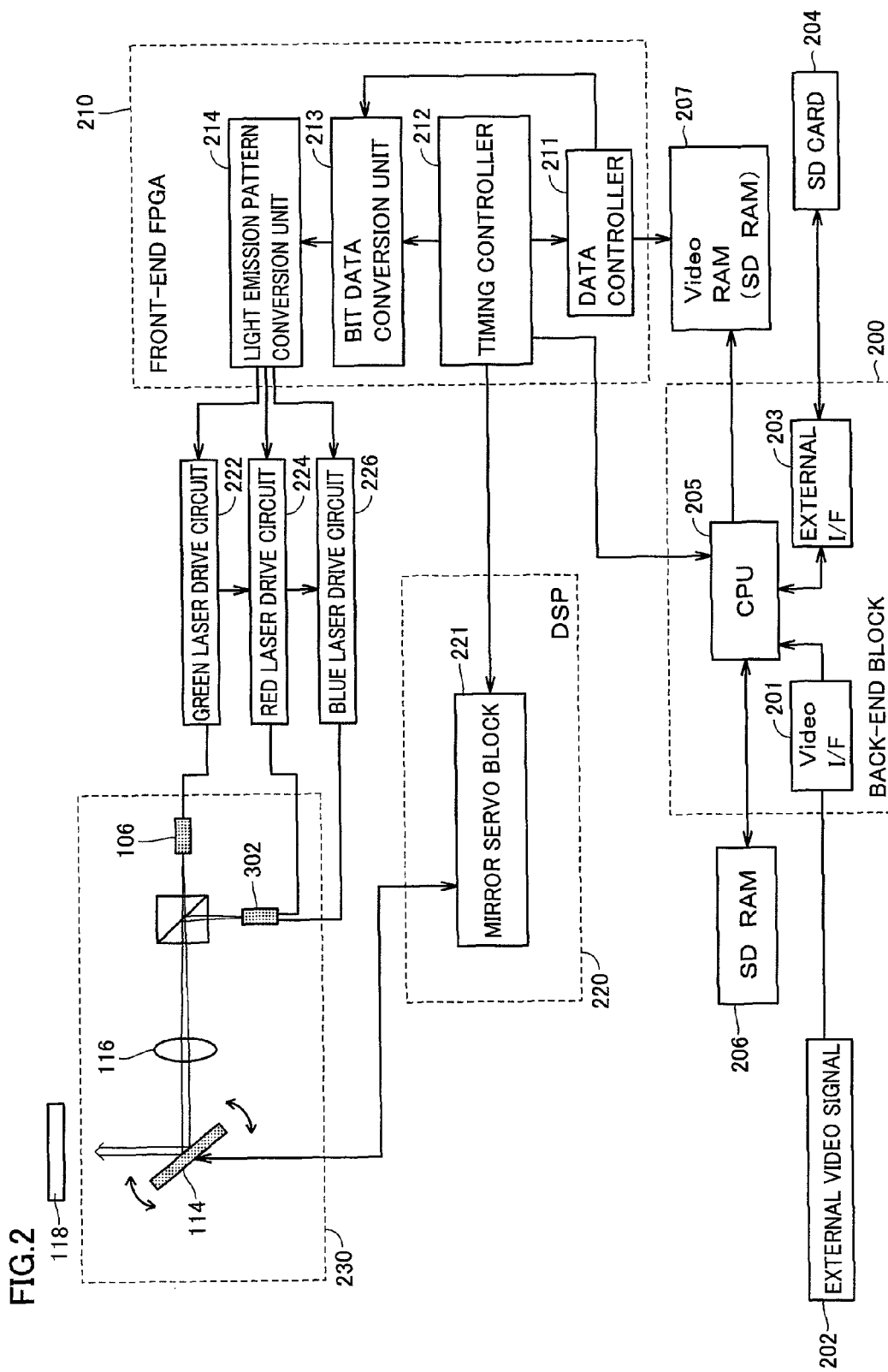
FIG. 2 is a diagram showing a configuration of a laser projector according to a first embodiment in the form of a block diagram.

FIG. 2 is a diagram showing a configuration of a laser projector according to a first embodiment in the form of a block diagram. With reference to FIG. 2, the configuration of the laser projector will be described.

The laser projector generally includes a back-end block 200, a front-end FPGA (Field Programmable Gate Array) 210, a DSP (Digital Signal Processor) 220, a green laser drive circuit 222, a red laser drive circuit 224, a blue laser drive circuit 226, an optical system 230, and a screen 118.

Back-end block 200 processes an image signal to be projected on screen 118. Back-end block 200 includes a Video I/F (interface) 201, an external I/F 203 and a CPU 205. Video I/F 201 receives an external video signal 202. External I/F 203 reads data of an external recording medium such as an SD card 204. CPU 205 processes signals taken by Video I/F 201 and external I/F 203. When the signals are processed, a program is executed on an SDRAM (Synchronous Dynamic Random Access Memory) 206. CPU 205 writes into a Video RAM 207 (or SDRAM 206) image data to be displayed on screen 118.

Front-end FPGA 210 includes a data controller 211, a timing controller 212, a bit data conversion unit 213, and a light emission pattern conversion unit 214. Data controller 211 reads image data from Video RAM 207. Bit data conversion unit 213 converts the data read by data controller 211 into bit data. Light emission pattern conversion unit 214 converts the bit data into a signal representing a light emission pattern of each laser. Timing controller 212 controls the operation timing of data controller 211 and bit data conversion unit 213 as described above. Timing controller 212 also controls the operation timing of CPU 205 and a mirror servo block 221 as described below.

DSP 220 performs image processing. DSP 220 includes mirror servo block 221. Mirror servo block 221 controls the operation of a two-axis galvanometer mirror 114 based on a signal from timing controller 212.

Green laser drive circuit 222 drives a green laser 106 based on a signal that is output from light emission pattern conversion unit 214. Red laser drive circuit 224 and blue laser drive circuit 226 drive a two-wavelength laser 302 based on a signal that is output from light emission pattern conversion unit 214.

Figure 3:
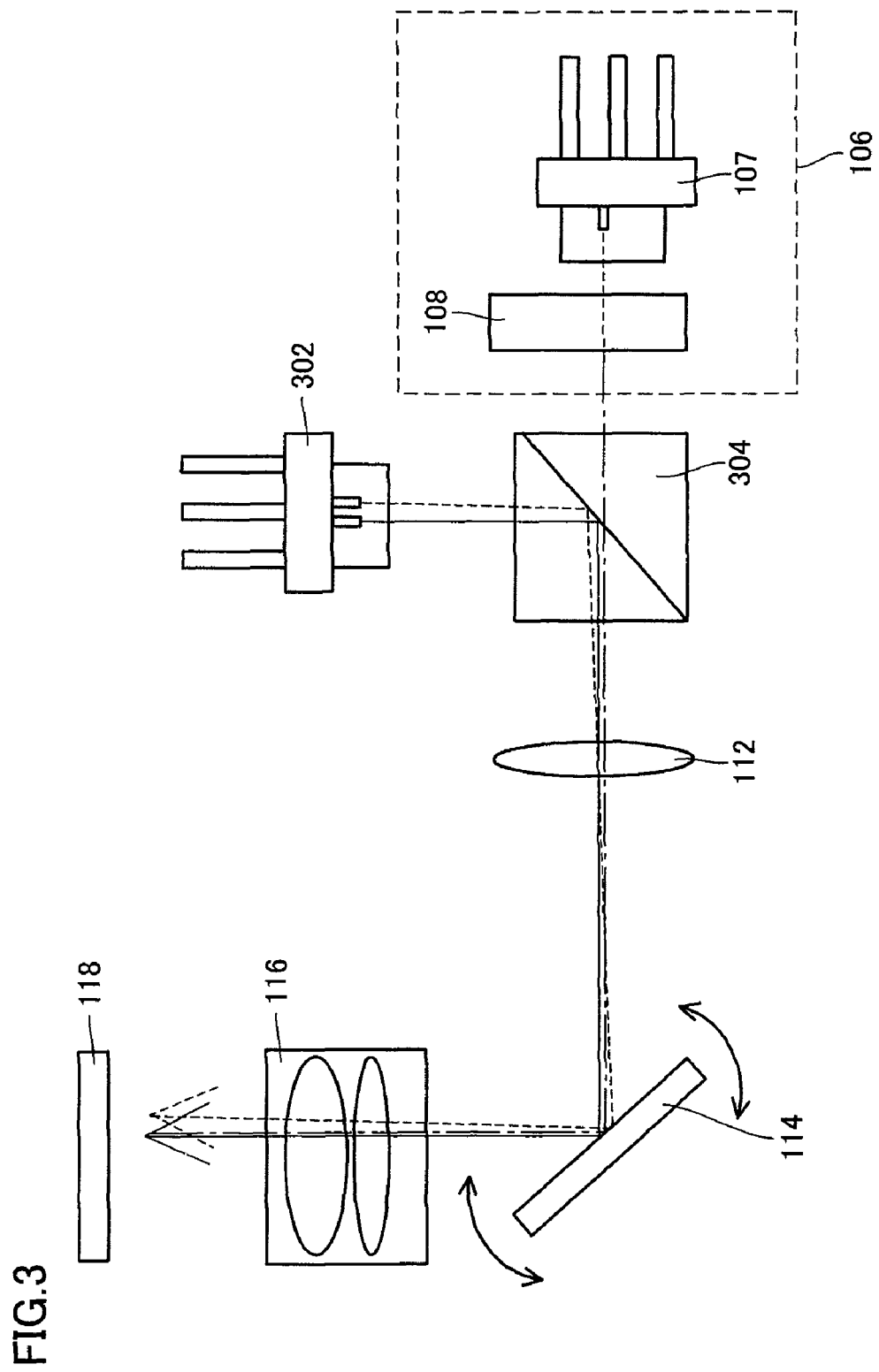
FIG. 3 is a diagram illustrating an optical system of the laser projector according to the first embodiment.

Optical system 230 will be described with reference to FIG. 3. FIG. 3 is a diagram illustrating the optical system of the laser projector according to the first embodiment. As shown in FIG. 3, the laser projector includes green laser 106, two-wavelength laser 302, a PBS 304, a collimator lens 112, a two-axis galvanometer mirror 114, a group of lenses 116, and screen 118.

Green laser 106 outputs a green laser beam. Two-wavelength laser 302 includes two laser elements emitting laser beams of different colors respectively that are contained in a single CAN package. In the present embodiment, two-wavelength laser 302 emits red and blue laser beams.

PBS 304 is provided at the position where respective optical paths of the laser beams emitted from respective lasers cross each other to cause these optical paths to coincide with each other. Two-wavelength laser 302 is positioned in the direction where the optical axis is rotated 90 degrees with respect to green laser 106. PBS 304 passes approximately 100% of the green laser beam and reflects approximately 100% of the red laser beam and the blue laser beam. PBS 304 is an example of a synthesizing element causing a plurality of optical paths to coincide with each other, and a dichroic mirror or the like may be used instead of PBS 304.

In the present embodiment, green laser 106 is illustrated as a combination of an infrared laser 107 and an SHG element 108. The green laser, however, may be configured differently from the illustrated one.

Further, a red (or blue) laser may be used instead of green laser 106, and a two-wavelength laser that is a combination of a blue (or red) laser and a green laser may be used. At the present time, however, it is difficult to configure the green laser in the form of a chip as compared with the red laser or blue laser and thus it is difficult to incorporate the green laser into the two-wavelength laser. Therefore, the configuration shown in the figure is desirable.

Here, a specific example of the two-wavelength laser will be described. One type of the two-wavelength laser is a monolithic two-wavelength laser. The monolithic two-wavelength laser is fabricated by integrating two types of lasers on one chip, which is disclosed for example in "Monolithic Integrated Two-Wavelength Laser Diode for DVD-ROM/CD-ROM," Toshiba Review, Vol. 55, No. 8, pp. 66-69 (2000) (hereinafter referred to as Non-Patent Document 1).

Figure 4:
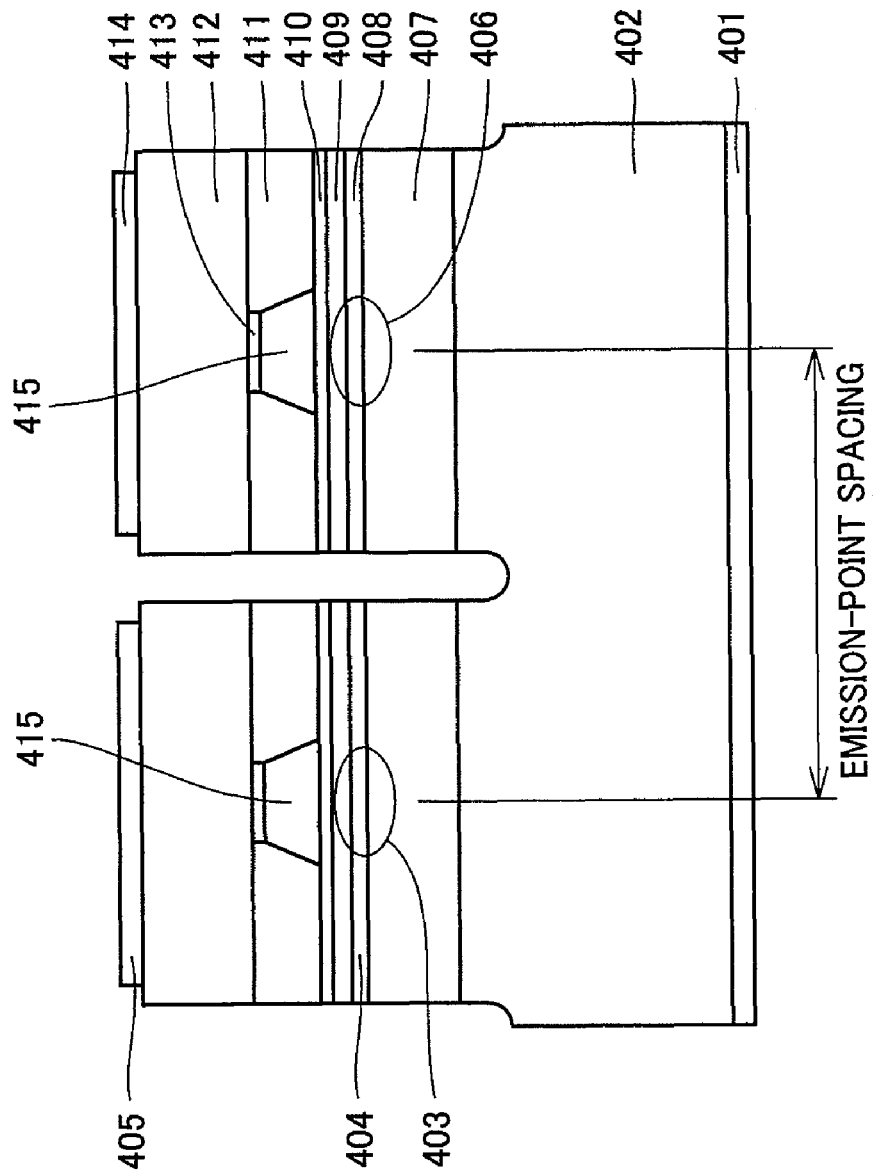
FIG. 4 is a diagram showing a cross-sectional structure of a monolithic two-wavelength laser disclosed in Non-Patent Document 1.

FIG. 4 is a diagram showing a cross-sectional structure of the monolithic two-wavelength laser disclosed in Non-Patent Document 1. The monolithic two-wavelength laser disclosed in Non-Patent Document 1 is configured to integrate a DVD-reading LD (Laser Diode) of 650 nm wavelength range and a CD-reading LD of 780 nm wavelength range. As shown in FIG. 4, the monolithic two-wavelength laser disclosed in Non-Patent Document 1 includes a common electrode 401, an n-GaAs substrate 402, an AlGaAs active layer 404, a CD-side electrode 405, an n-InGaAlP cladding layer 407, an InGaP MQW active layer 408, a p-InGaAlP cladding layer 409, an InGaP etching stop layer 410, an n-GaAs current block layer 411, a p-GaAs contact layer 412, a p-InGaP 413, a DVD-side electrode 414, and a p-InGaAlP ridge-type optical guide 415. This laser is fabricated to have the spacing between a CD light emission point 403 and a DVD light emission point 406 (emission-point spacing) with a precision of ±1 μm.

Figure 5:
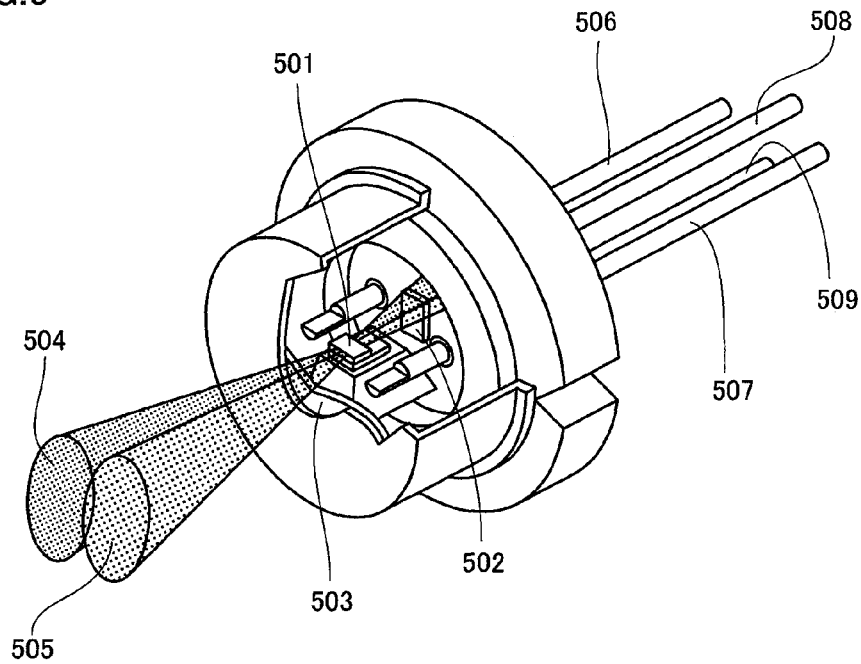
FIG. 5 is a diagram showing a structure of a product including the monolithic two-wavelength laser disclosed in Non-Patent Document 1 that is incorporated in a package.

FIG. 5 is a diagram showing a structure of a product including the monolithic two-wavelength laser disclosed in Non-Patent Document 1 that is incorporated in a package. In the package, a two-wavelength LD chip 501 and a monitor PD (photodiode) 502 are incorporated. A 650-nm laser beam 504 and a 780-nm laser beam 505 emitted from two-wavelength LD chip 501 are taken from a window glass 503. A DVD anode 506, a CD anode 507 and a PD anode 508 are connected by a common cathode 509.

Figure 6:
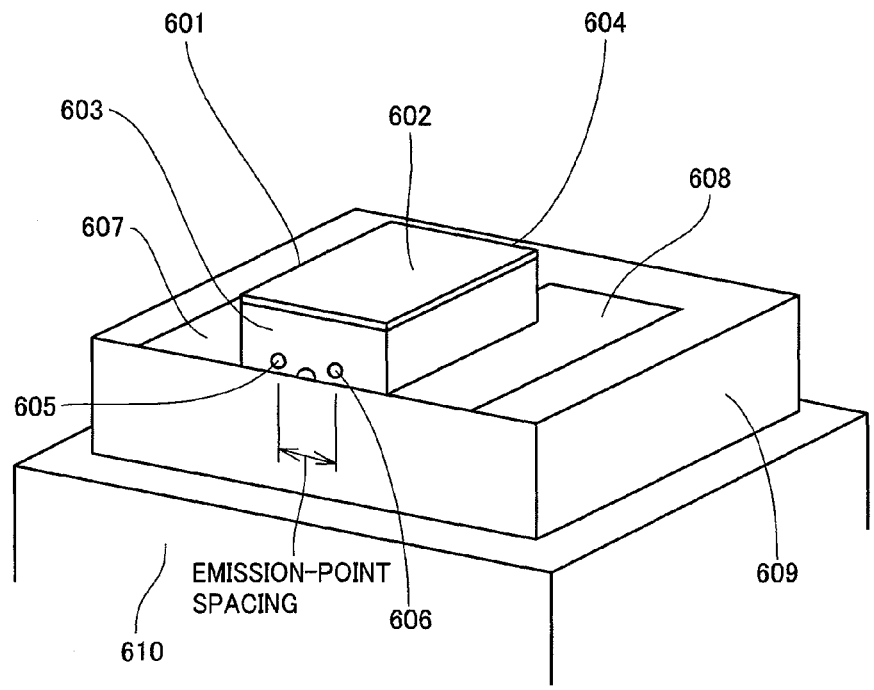
FIG. 6 is a diagram showing a mount portion of the monolithic two-wavelength laser disclosed in Non-Patent Document 1.

FIG. 6 is a diagram showing a mount portion of the monolithic two-wavelength laser disclosed in Non-Patent Document 1. A two-wavelength laser chip 601 includes a common cathode electrode 602, a cleavage plane (front surface) end-face protection film 603, and a cleavage plane (rear surface) end-face protection film 604. In order to release heat, two-wavelength laser chip 601 is mounted on an electrically insulating aluminum nitride (AlN) sub-mount 609. Electrically insulating AlN sub-mount 609 is patterned with a DVD anode bonding pad 607 and a CD anode bonding pad 608. Electrically insulating AlN sub-mount 609 is mounted on a heat sink 610.

Another type of the two-wavelength laser different from the monolithic two-wavelength laser is a two-chip one-mount two-wavelength laser. This laser is fabricated by attaching two types of laser chips onto a sub-mount with a jig. While the two-chip one-mount laser is inferior to the monolithic laser in terms of the emission-point spacing due to the use of the jig for attaching the laser chips, the former laser is advantageous in that a generally used single wavelength laser chip can be directly used for each chip.

For the present invention, any of the two types of the two-wavelength lasers as described above may be used. Alternatively, a two-wavelength laser configured differently may be used.

With reference to FIG. 3 again, the optical system will be further described. Collimator lens 112 collimates the light transmitted through PBS 304 into parallel light. Two-axis galvanometer mirror 114 scans the light passed through collimator lens 112. Here, two-axis galvanometer mirror 114 is an example of the scanning element used for scanning a laser beam, and a space modulator such as DMD (Digital Micromirror Device) may be used instead of two-axis galvanometer mirror 114. The group of lenses 114 focuses the light reflected from two-axis galvanometer mirror 114 on screen 118.

As seen from the above, the laser projector in the present embodiment includes the two-wavelength laser that is conventionally used for a CD/DVD optical pickup. Therefore, the number of components of the laser projector in the present embodiment is smaller than that of the conventional laser projector. Accordingly, the laser projector in the present embodiment can be reduced in size as compared with the conventional laser projector. Further, in the laser projector of the present embodiment, the number of synthesizing elements can be reduced to one, while the conventional laser projector requires two synthesizing elements, so that deterioration in transmission rate of the laser can be prevented. Thus, regarding the laser projector in the present embodiment, deterioration in quantity of emitted light can be prevented. Further, in the laser projector of the present embodiment, the number of elements to be adjusted can be reduced.

The two-wavelength laser has an emission-point difference as shown for example in FIG. 4. Accordingly, as shown in FIG. 3, the light emission point of the red laser and the light emission point of the blue laser in the two-wavelength laser are slightly displaced from each other. Therefore, the optical path of the red beam and the optical path of the blue beam do not exactly coincide with each other, so that color displacement occurs to an image on the screen. In the following, a modification of the present embodiment with which this color displacement can be corrected will be described.

Figure 7:
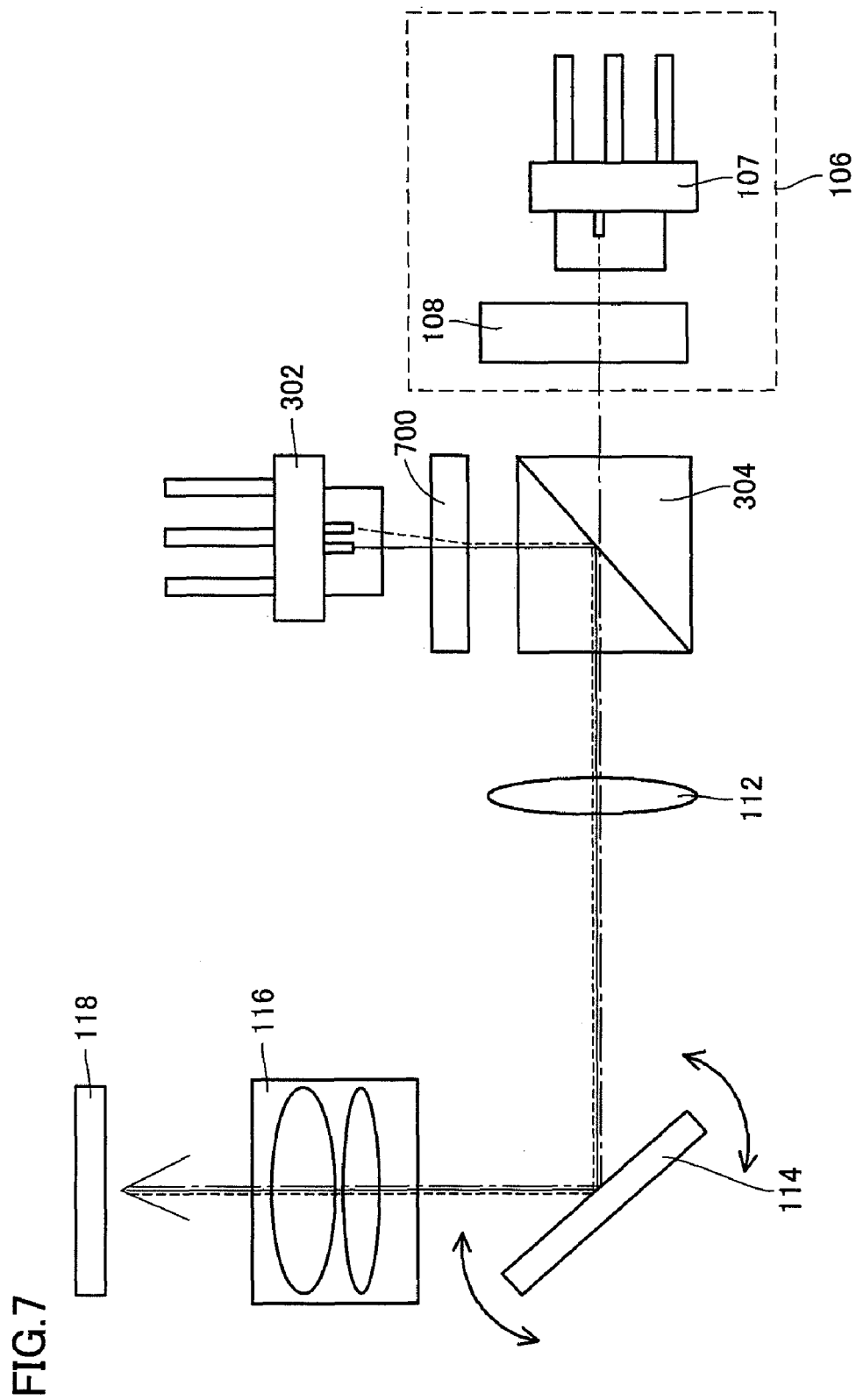
FIG. 7 is a diagram illustrating an optical system additionally including a hologram element 700.

For example, an optical system as shown in FIG. 7 additionally including a hologram element 700 can be used to correct the color displacement. In the present embodiment, hologram element 700 is placed as shown in FIG. 7 between two-wavelength laser 302 and PBS 304.

Figure 8:
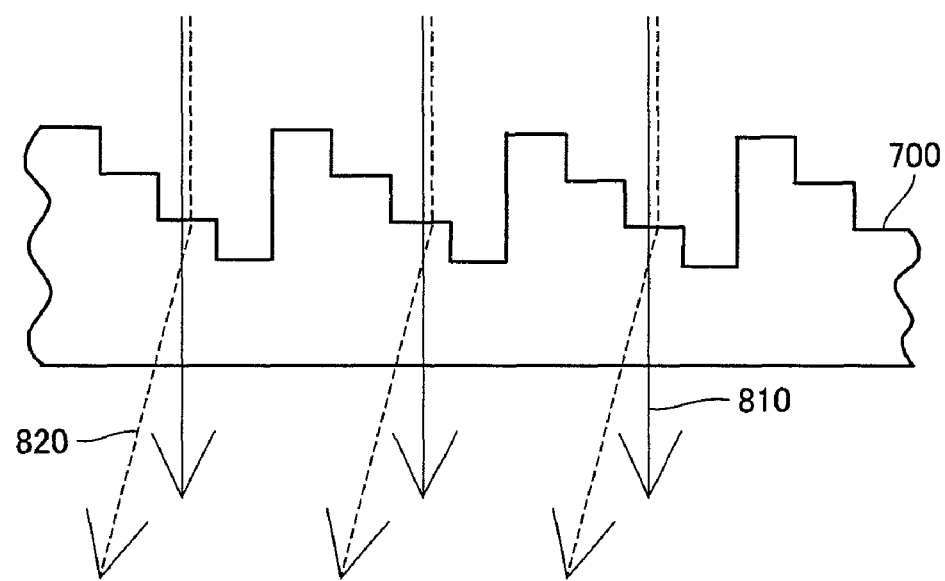
FIG. 8 is a diagram showing a structure of hologram element 700.

Here, hologram element 700 will be described with reference to FIG. 8. FIG. 8 is a diagram showing a structure of hologram element 700. As shown in FIG. 8, hologram element 700 is a brazed-type diffraction grating having a stepwise structure. The depth of the step is designed such that one laser beam is transmitted through the hologram element without its direction changed while the other laser beam is transmitted therethrough with its direction changed.

Specifically, the depth of the step is designed such that the depth is equal to an integral multiple of the wavelength of a blue laser beam 810. Therefore, as for blue laser beam 810, chiefly a zero-order beam is transmitted through hologram element 700. Thus, the direction of the optical axis of blue laser beam 810 before the beam is transmitted through hologram element 700 and the direction thereof after the beam is transmitted therethrough are identical. Further, the depth of the step is adjusted such that the intensity of a first-order beam of a red laser beam 820 is maximized. Therefore, as for red laser beam 820, chiefly a first-order diffracted beam is transmitted through hologram element 700. Accordingly, when red laser beam 820 is transmitted through hologram element 700, the direction of the optical axis of the red laser beam changes.

Hologram element 700 having the above-described structure can be used to correct the influence of the emission-point difference. The color displacement can thus be corrected.

Figure 9:
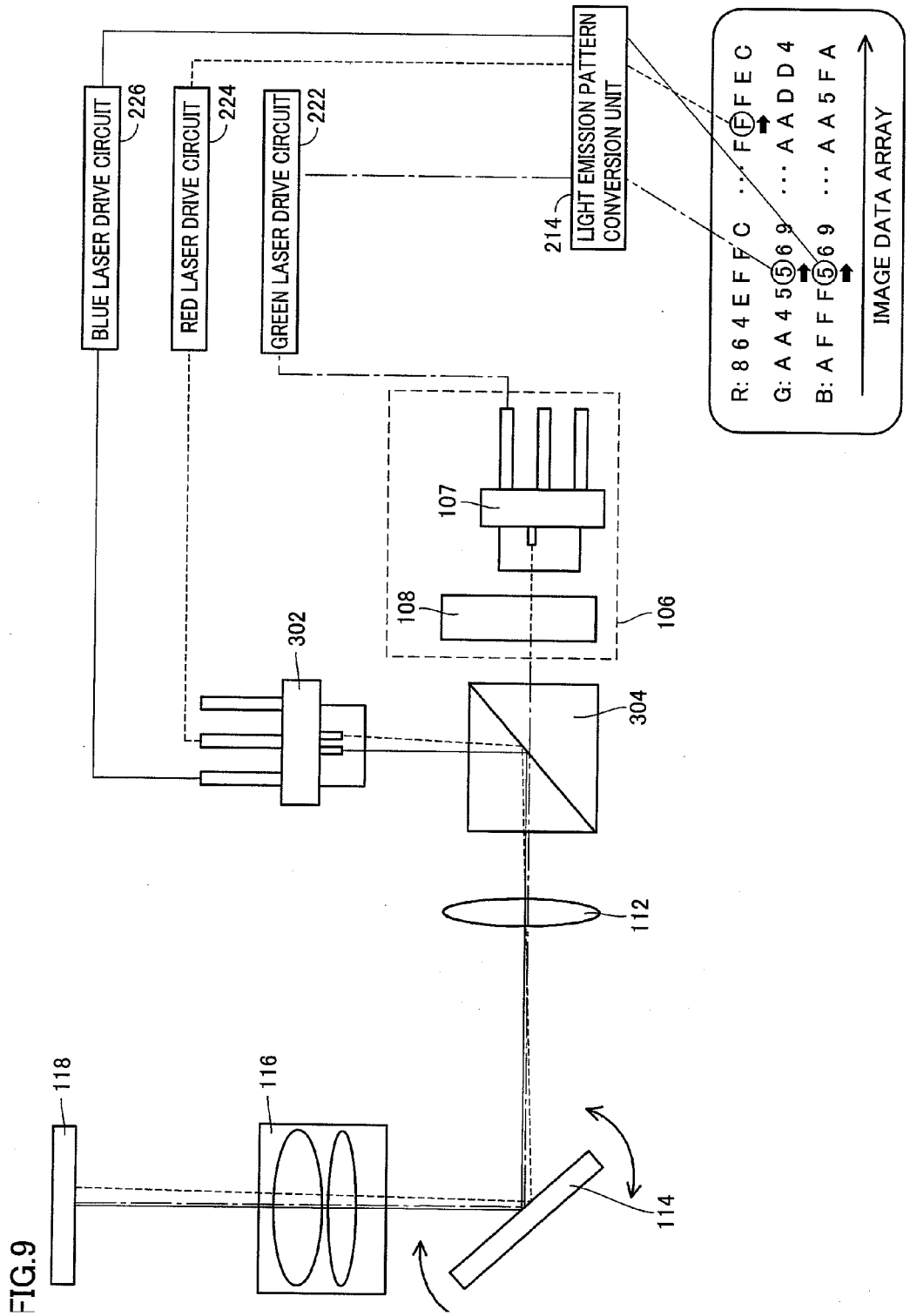
FIG. 9 is a diagram illustrating a system for correcting color displacement.

Further, the color displacement can also be corrected using a system as shown in FIG. 9. FIG. 9 is a diagram illustrating a system for correcting the color displacement. In the case where the optical axis direction of a laser beam of a certain color is displaced from the optical axis direction of laser beams of other two colors, the beam of the certain color is always applied to a point displaced by a certain distance from the point where the other beams are applied. Therefore, light emission pattern conversion unit 214 displaces the address position of the displaced color (red in this case) and accordingly reads data. Based on the data with the address position displaced, the operations of green laser drive circuit 222, red laser drive circuit 224 and blue laser drive circuit 226 are controlled. With this configuration, an image without visual color displacement can be obtained.

Here, the amount by which the address position is displaced is determined according to displacement on the screen. For example, light emission pattern conversion unit 214 receives an instruction specifying the amount by which the address position is displaced, and determines the amount by which the address position is displaced, following the instruction. With this configuration, a user can see an image on the screen and accordingly adjust the color displacement.

Figure 20:
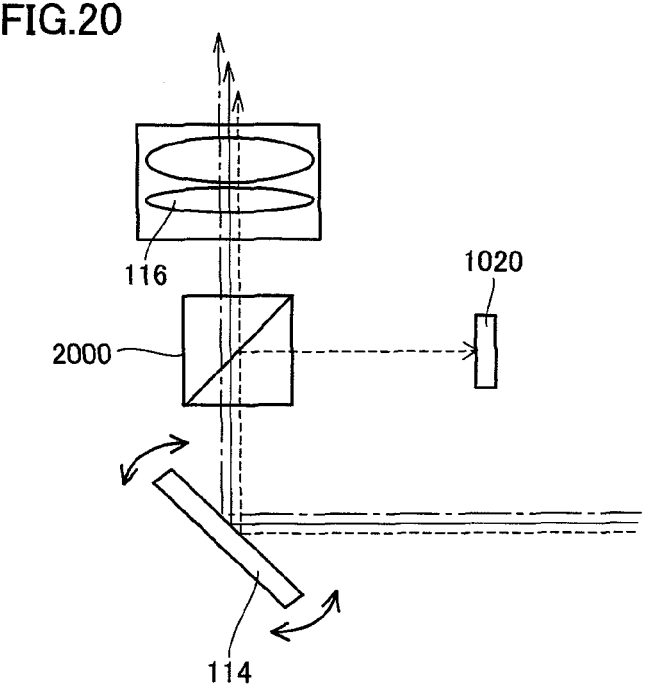
FIG. 20 is a diagram illustrating an optical system splitting off a part of a laser beam for image display.

Further, the color displacement can be self-calibrated by a system. For this purpose, an optical system as shown in FIG. 20 is used. Specifically, an optical system including a beam splitter 2000 placed between two-axis galvanometer mirror 114 and the group of lenses 116 in the optical system of FIG. 9 is used. Beam splitter 2000 splits off a part of the laser beam that is reflected from two-axis galvanometer mirror 114 for displaying an image. At the position where the split off laser beam is to be detected, a photodetector 1020 is placed.

Figure 11:
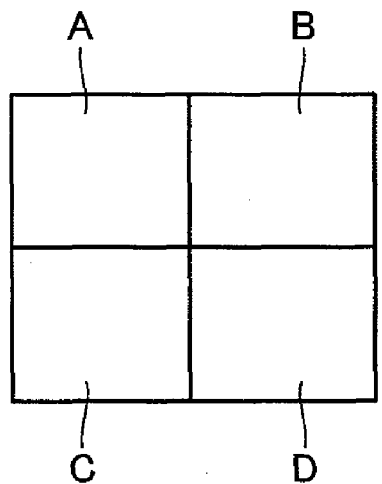
FIG. 11 is a diagram showing a detection surface of a photodetector 1020.

Photodetector 1020 outputs a signal according to the detected light. Further, it is supposed here that photodetector 1020 is a multi-division detector having its detection surface formed of a plurality of cells. FIG. 11 shows the detection surface of photodetector 1020. As shown in FIG. 11, the detection surface of photodetector 1020 in the present embodiment is divided into four cells, namely cell A to cell D. The number of cells, however, is not limited to this. The detection surface may be divided into at least two cells. Further, the detection surface may be divided into more than four cells.

Figure 13:
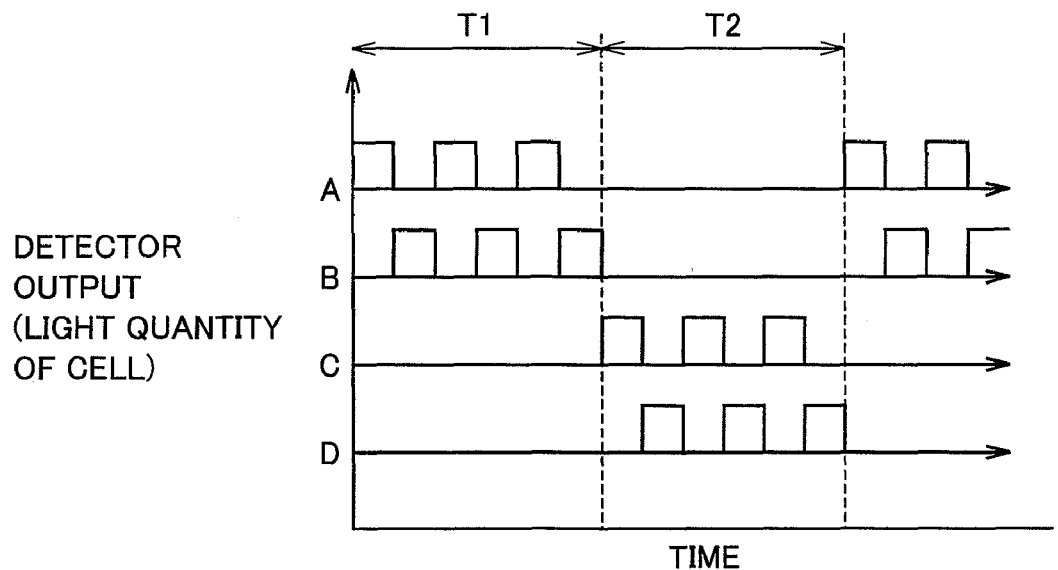
FIG. 13 is a diagram showing respective outputs of cells in the case where normal scanning is performed.
Figure 19:
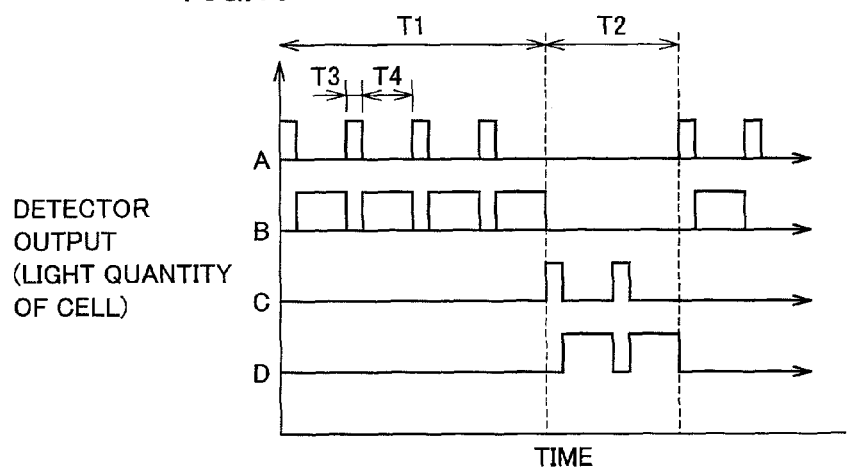
FIG. 19 is a diagram showing respective outputs of cells in the case where the moveless position during rotation of two-axis galvanometer mirror 114 or the central position of the optical axis is displaced.

In order to carry out the self-calibration, the projector first performs for example one-frame scanning successively using a single color of R, G and B each when the projector is activated. Thus, in the case where there is no color displacement, the signal as shown in FIG. 13 should be obtained for each color. In contrast, in the case where there is color displacement, the signal as shown in FIG. 19 should be obtained. Based on this characteristic, determination unit 1030 calculates an amount of displacement from the ratio between T1 and T2 and the ratio between T3 and T4 of the detection signal of photodetector 1020. With the known amount of displacement, the color displacement can be corrected by shifting the timing at which data is transmitted to each light source by light emission pattern conversion unit 214 according to the amount of displacement.

Further, in the case where the beam has a certain area and the angle of rotation for movement between pixels is extremely smaller than the width of each beam, determination unit 1030 can determine the instant at which the beam spot is located at the center of the detector, from the ratio between the quantities of light of cells A, B, C, D for each beam of RGB, without comparing the duty ratio. For example, determination unit 1030 regards the timing at which the ratio between (light quantity of cell A+light quantity of cell B) and (light quantity of cell C+light quantity of cell D), or the ratio between (light quantity of cell A+light quantity of cell C) and (light quantity of cell B+light quantity of cell D) becomes minimum, as the instant at which the beam spot is located at the center of the detector. From these results of calculation, determination unit 1030 calculates a displacement in time of each light source. According to the displacement in time, light emission pattern conversion unit 214 shifts the timing of data transmitted to each light source, and accordingly can correct the color displacement.

The above-described two correction schemes may be used together. For example, hologram element 700 may be used to roughly correct the emission-point difference and then the drive circuit may be controlled to precisely correct the color displacement.

<Modification>

The chief object of the system-based correction of color displacement as described above may not be the correction of the emission-point difference. A description will be given of a modification in which the above-described color-displacement correction system is applied to a laser projector having an optical system with another configuration.

Regarding the laser projector, color displacement of laser beams on a projection surface occurs due to various factors other than the emission-point difference of the two-wavelength laser. For example, due to displacement of optical paths of laser beams resulting from an initial optical-system arrangement, the color displacement may occur. Further, due to deterioration with age, a part of optical components may be displaced to cause color displacement.

The color displacement as described above may be corrected by mechanical adjustments. For example, the position or angle of an optical component such as lens, beam splitter included in the optical system may be adjusted.

The laser projector, however, includes a large number of components, and thus correction of the color displacement by the mechanical adjustments is troublesome and may be difficult in some cases.

In contrast, the present modification corrects the color displacement by controlling the emission timing of each laser according to the amount of color displacement as described above. Therefore, the mechanical adjustment is unnecessary.

As the laser projector of the present modification, a laser projector having a control system for controlling the timing of emission of each laser is used. For example, the optical system as shown in FIG. 9 is used. Here, the optical system may not be configured to combine a two-wavelength laser and a single-wavelength laser as shown in FIG. 9. The optical system may be an optical system using three independent lasers as shown in FIG. 1. Further, the laser projector may be combined with the optical system as shown in FIG. 20 to carry out the self-calibration.

In accordance with the present modification, the above-described method can also be used to make initial adjustments for color displacement between different lasers (in the case of FIG. 9, color displacement between the green laser beam and other laser beams). Further, in the case where the color displacement occurs due to displacement of a part of optical components resulting from deterioration with age, the correction can be easily made with the system.

As described above, the laser projector according to the present embodiment can also correct the color displacement.

[Second Embodiment]

A laser projector according to a second embodiment is provided to solve the above-described problem concerning detection of an abnormality in scanning, and speedily detects an abnormality in scanning.

The laser projector according to the present embodiment detects a reference light using a multi-division detector. Therefore, the laser projector in the present embodiment can speedily detect an abnormality in scanning.

The second embodiment of the present invention will be hereinafter described with reference to the drawings. In the following description, like components are denoted by like reference characters. They are named identically and function identically. Therefore, a detailed description thereof will not be repeated.

The laser projector in the second embodiment generally includes, as described in connection with the first embodiment with reference to FIG. 2, a back-end block 200, a front-end FPGA 210, a DSP 220, a green laser drive circuit 222, a red laser drive circuit 224, a blue laser drive circuit 226, an optical system 230, and a screen 118.

Figure 10:
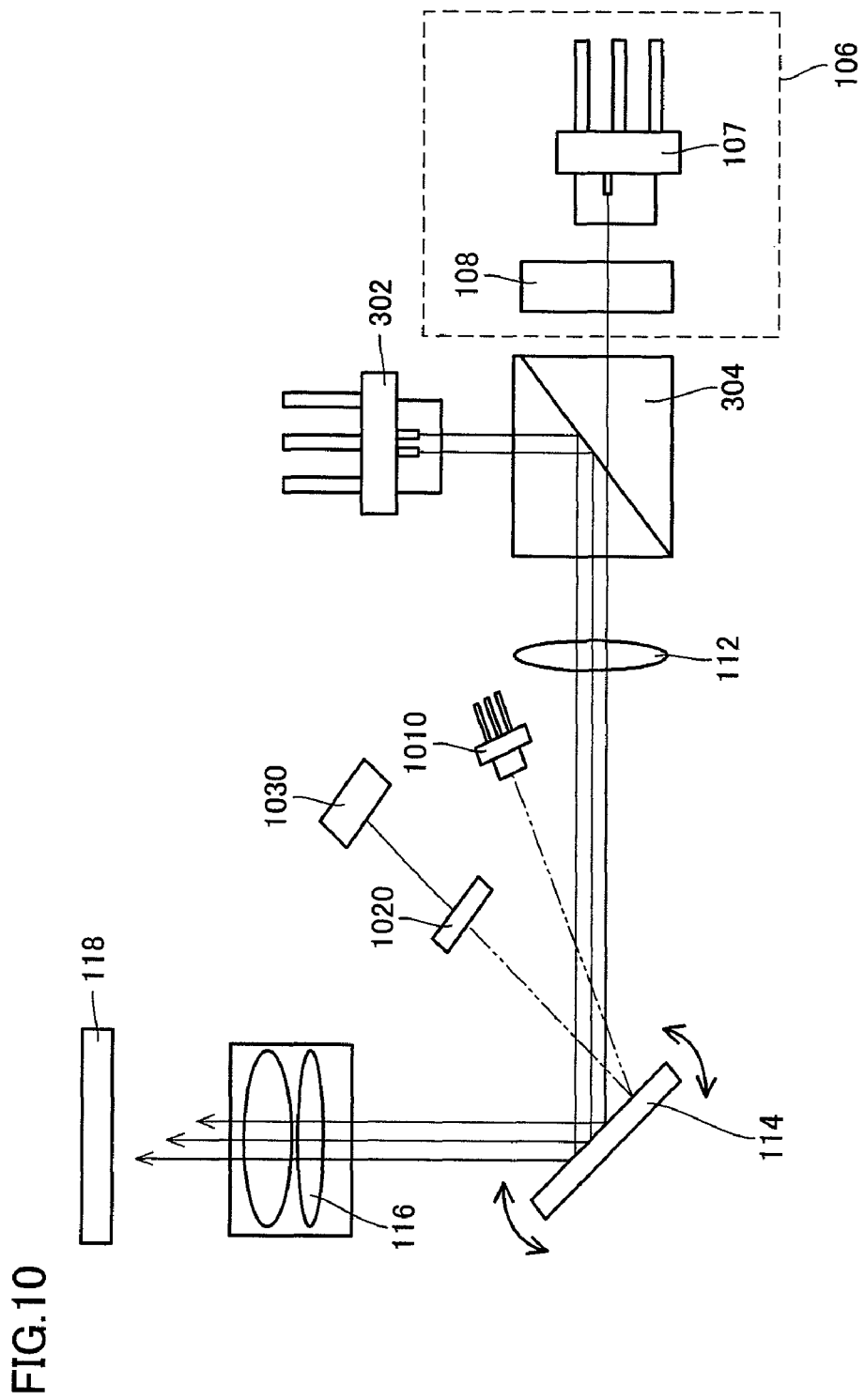
FIG. 10 is a diagram illustrating an optical system of a laser projector according to a second embodiment.

Then, optical system 230 will be described with reference to FIG. 10. FIG. 10 is a diagram illustrating the optical system of the laser projector in the second embodiment. As shown in FIG. 10, the laser projector includes a green laser 106, a two-wavelength laser 302, a PBS 304, a collimator lens 112, a two-axis galvanometer mirror 114, a group of lenses 116, and screen 118.

Green laser 106 emits a green laser beam. Two-wavelength laser 302 includes laser elements emitting laser beams of different two colors that are contained in a single CAN package. In the present embodiment, the two-wavelength laser emits red and blue laser beams.

PBS 304 is placed at the position where respective optical paths of laser beams emitted from respective lasers cross each other to cause these optical paths to coincide with each other. Two-wavelength laser 302 is placed in the direction where the optical axis direction is rotated by 90 degrees with respect to green laser 106. PBS 304 passes substantially 100% of the green laser beam, and reflects substantially 100% of the red laser beam and the blue laser beam. Here, PBS 304 is an example of the synthesizing element causing a plurality of optical paths to coincide with each other, and a dichroic mirror or the like may be used instead of PBS 304.

While green laser 106 is formed of a combination of an infrared laser 107 and an SHG element 108 in the present embodiment, the green laser may be configured differently from the above-described one.

Further, a red (or blue) laser may be used instead of green laser 106, and a two-wavelength laser formed of a combination of a blue (or red) laser and a green laser may be used. At the present time, however, it is difficult to produce the green laser in the form of a chip, as compared with the red laser and blue laser and thus it is difficult to incorporate the green laser into the two-wavelength laser. Therefore, the configuration as shown in the figure is desirable.

While the example where the two-wavelength laser is used is shown here, a red laser, a blue laser and two synthesizing elements may be used instead of the two-wavelength laser and one PBS.

Collimator lens 112 collimates the light transmitted through PBS 304 into parallel light. Two-axis galvanometer mirror 114 scans the light transmitted through collimator lens 112. The group of lenses 116 focuses the light reflected from the galvanometer mirror on screen 118.

The laser projector further includes a reference laser 1010, a photodetector 1020 and a determination unit 1030. Reference laser 1010 emits a reference laser beam toward two-axis galvanometer mirror 114. In the present embodiment, a description will be given supposing that the reference laser is an infrared laser. Photodetector 1020 detects the reference laser beam reflected from two-axis galvanometer mirror 114, and outputs a signal according to the detected light beam. It is supposed here that photodetector 1020 is a multi-division detector having its detection surface formed of a plurality of cells. FIG. 11 shows a detection surface of photodetector 1020. As shown in FIG. 11, the detection surface of photodetector 1020 in the present embodiment is divided into four cells, namely cell A to cell D. The number of cells, however, is not limited to this. The detection surface may be divided into at least two cells. Alternatively, the detection surface maybe divided into more than four cells.

From the signal that is output from photodetector 1020, an abnormality in scanning can be found, which will be explained in the following.

Figure 12:
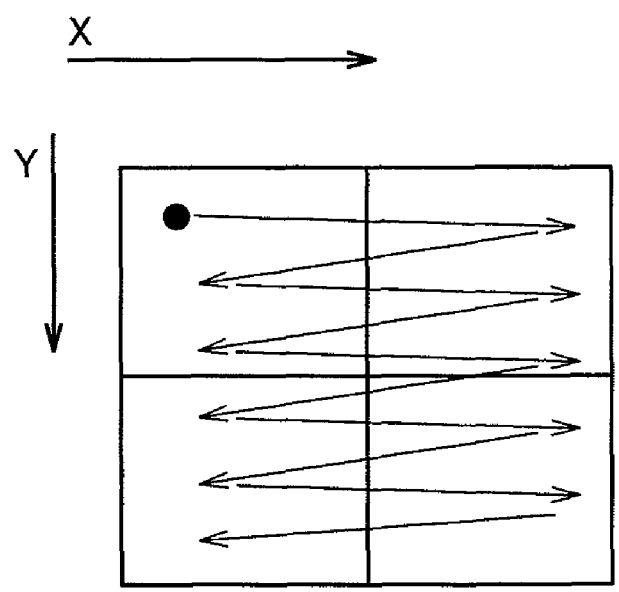
FIG. 12 is a diagram showing a trace of a laser beam in the case where normal scanning is performed.

In the case where two-axis galvanometer mirror 114 operates normally, scanning on the detection surface is done leaving the trace as shown in FIG. 12. Here, in FIG. 12, the x direction is the direction parallel to the ground, and the y direction is the direction perpendicular to the ground, on the screen.

Respective outputs of the cells (cell A, cell B, cell C, cell D) of the detector in this case are shown in FIG. 13. In this case, respective integrals per frame of the outputs of cell A, cell B, cell C, cell D of the detector are equal to each other, and T1 and T2 are also equal to each other. Respective periods of pulses that are output from respective cells are also constant, and the duty ratio is 50%. In FIG. 13, it is supposed that the spot size of a beam applied to the detector is extremely small, so that the output of each cell of the detector is a rectangular wave in shape. In the case, however, where the beam is applied to the detector with a larger spot, the output of each cell of the detector is a sinusoidal wave in shape. In this case, however, the output may be binarized with respect to a certain threshold to obtain a similar waveform.

Figure 14:
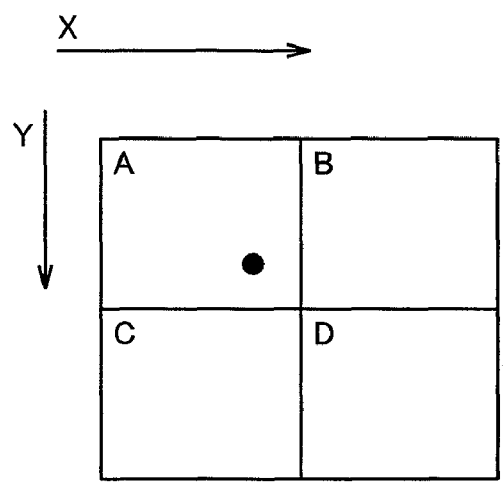
FIG. 14 is a diagram showing a trace of a laser beam in the case where an operation of a two-axis galvanometer mirror 114 is completely stopped.
Figure 15:
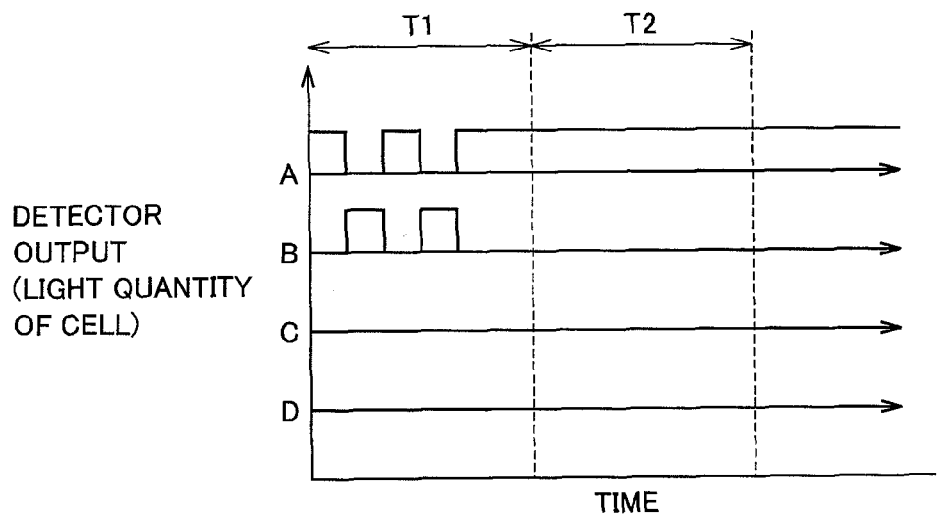
FIG. 15 is a diagram showing respective outputs of cells in the case where an operation of two-axis galvanometer mirror 114 is completely stopped.

When two-axis galvanometer mirror 114 does not operate at all, the beam on the detector is also stationary at a fixed position. FIG. 14 shows an example where the beam stops at cell A. In this case where two-axis galvanometer mirror 114 is stopped, respective outputs of the cells are such that only cell A provides the output as shown in FIG. 15.

Figure 16:
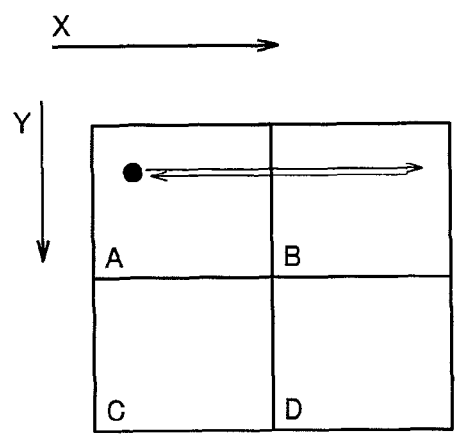
FIG. 16 is a diagram showing a trace of a laser beam in the case where the operation in the y-axis direction of two-axis galvanometer mirror 114 is stopped.
Figure 17:
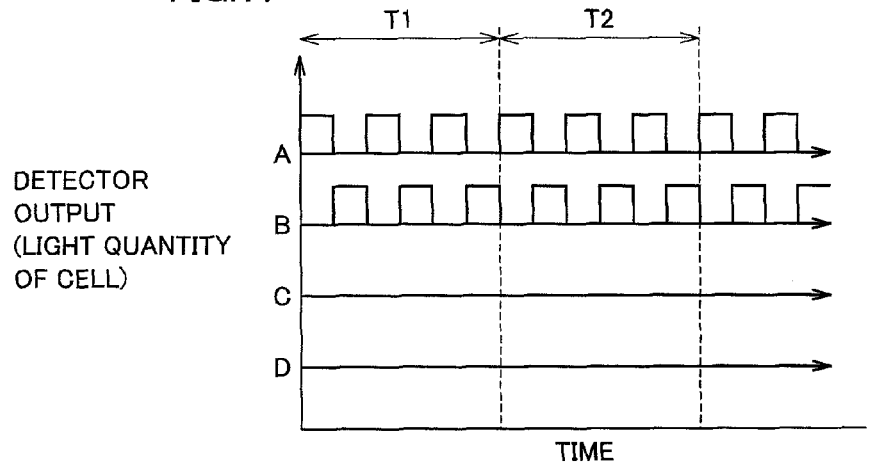
FIG. 17 is a diagram showing respective outputs of cells in the case where the operation in the y-axis direction of two-axis galvanometer mirror 114 is stopped.

Further, the case where the operation in the y-axis direction of two-axis galvanometer mirror 114 is stopped will be explained with reference to FIGS. 16 and 17. In this case, as shown in FIG. 16, a beam scans cell A and cell B. Therefore, as shown in FIG. 17, the output of photodetector 1020 is pulse signals from cell A and cell B only. In the case where the operation in the x-axis direction of two-axis galvanometer mirror 114 is stopped, the output of photodetector 1020 is pulse signals from cell A and cell C only (or from cell B and cell D only).

Figure 18:
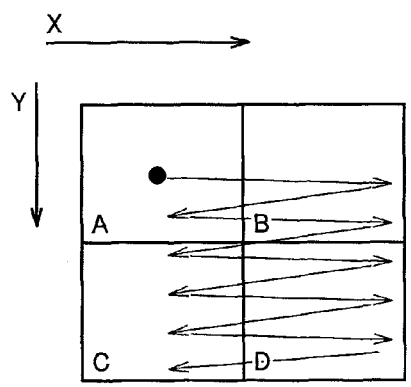
FIG. 18 is a diagram showing a trace of a laser beam in the case where the moveless position during rotation of two-axis galvanometer mirror 114 or the central position of the optical axis is displaced.

A description will be given of an abnormality of a detection signal in the case where the mirror of two-axis galvanometer mirror 114 does not rotate normally (or the optical axis is displaced in the set). For example, in the case where the moveless position during rotation of two-axis galvanometer mirror 114 or the central position of the optical axis as converted into the position on the detector is shifted in the positive X direction and the positive Y direction, the trace of the beam on the detection surface is the one as shown in FIG. 18. Accordingly, respective outputs of the cells are those as shown in FIG. 19. A displacement in the x direction results in a difference between respective duty ratios of the pulses (ratio between T3 and T4 in the figure). A displacement in the y direction results in the ratio between the period in which the output from cell A or cell B is detected and the period in which the output from cell C or cell D is detected, namely the ratio between T1 and T2.

Determination unit 1030 determines whether or not the detection signal is abnormal. When the determination unit determines that the detection signal is abnormal, the determination unit accordingly determines that scanning is abnormal. Specifically, a detection signal to be obtained when normal scanning is performed and a detection signal that is output from photodetector 1020 are compared with each other to determine whether or not scanning is abnormal. For example, determination unit 1030 stores a detection signal obtained when scanning is performed normally and, in the case where a detection signal that is output from photodetector 1020 and the stored detection signal are different from each other, the determination unit determines that the scanning is abnormal.

For this comparison, the period of the detection signal can be used. For example, determination unit 1030 determines that the scanning is normal in the case where the ratio of period T of the detection signal that is output from photodetector 1020 to period T0 in the normal case (ratio: T/T0) is within a predetermined range, and otherwise determines that the scanning is abnormal.

The laser projector in the present embodiment makes a determination about the scanning state using the multi-division detector and thus can speedily detect an abnormality in scanning. Further as described above, the laser projector in the present embodiment can detect various scanning abnormality patterns.

Further, the laser projector may have a mechanism for suppressing application of a laser beam to the screen in the case where determination unit 1030 determines that scanning is abnormal. For example, determination unit 1030 transmits to each laser drive circuit a signal for weakening the output of the laser beam or stopping the emission of the laser beam in the case where the determination unit determines that the scanning is abnormal. Alternatively, the laser beam may be blocked by transmitting a signal to a device that operates for physically blocking the laser beam, such as shutter. Such a mechanism can be used to enhance the safety of the laser projector.

Figure 21:
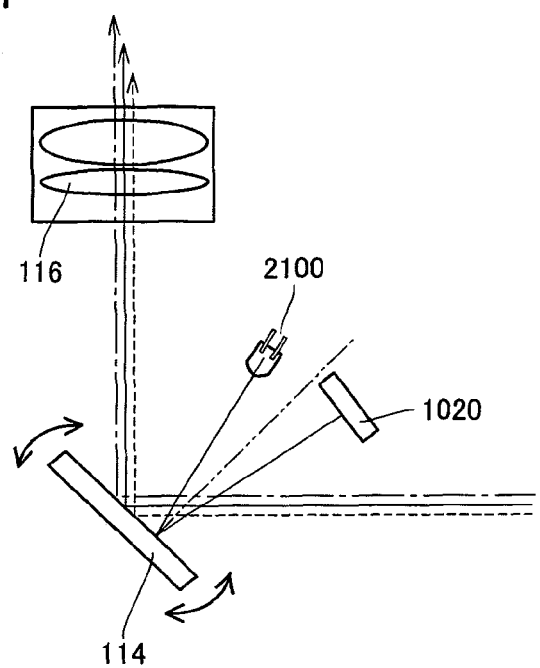
FIG. 21 is a diagram showing a modification of a reference laser 1010 shown in FIG. 10.

Here, the optical system used for detecting an abnormality in scanning is not limited to the one shown in FIG. 10. For example, the optical system as shown in FIG. 20 may be used. In this optical system, beam splitter 2000 is provided between two-axis galvanometer mirror 114 and a group of lenses 116. Beam splitter 2000 splits off a part of a laser beam that is reflected from two-axis galvanometer mirror 114 for displaying an image. At the position where the split-off laser beam is to be detected, photodetector 1020 is placed. Further, an optical system as shown in FIG. 21 may also be used. This optical system uses a lens-equipped LED (light-emitting diode) 2100 as the reference laser instead of the infrared laser.

The laser projector has been described above as an example of the image display apparatus. As clearly seen from the foregoing description, however, the image display apparatus in the present embodiment may be the one as described below.

An image display apparatus operates for displaying an image on a projection surface by applying a laser beam to the projection surface. The image display apparatus includes a laser emitting a laser beam, a scan device scanning the laser beam, a reference light generation unit generating a reference light to be scanned by the scan device that is emitted in a direction different from the direction toward the projection surface, a multi-division detector having a plurality of cells for detecting the reference light, and a determination unit determining whether or not a detection signal from each cell is abnormal and, when the determination unit determines that the detection signal is abnormal, the determination unit determines that the scanning is abnormal.

The determination unit may determine that the detection signal is abnormal when the period of the detection signal is abnormal.

The image display apparatus may further include a beam application suppression unit suppressing application of the laser beam to the projection surface when it is determined that the scanning is abnormal.

The scan device may include a movable mirror operating for applying a laser beam to the projection surface pixel by pixel. The reference light generation unit may be a light source emitting a light different from the laser beam toward the movable mirror. The multi-division detector may detect the light different from the laser beam that is reflected from the movable mirror.

The movable mirror may be a two-axis galvanometer mirror.

The scan device may include a scan element operating for applying a laser beam to the projection surface pixel by pixel. The reference light generation unit may be a beam splitter provided between the scan element and the projection surface.

[Third Embodiment]

A laser projector according to a third embodiment is provided to solve the above-described problem concerning collimation of a laser beam, and includes a simple calibration mechanism for collimating a laser beam into parallel light.

The laser projector in the present embodiment determines the degree of collimation of a laser beam by detecting a difference between the spread of a first-order diffracted light that is a part of a laser beam transmitted through a hologram element and the spread of a − (minus) first-order diffracted light. In other words, the laser projector in the present embodiment includes a simple calibration mechanism for making a laser beam parallel.

The third embodiment of the present invention will be hereinafter described with reference to the drawings. In the following description, like components are denoted by like reference characters. They are named identically and function identically. Therefore, a detailed description thereof will not be repeated.

The laser projector in the third embodiment generally includes, as described in connection with the first embodiment with reference to FIG. 2, a back-end block 200, a front-end FPGA 210, a DSP 220, a green laser control circuit 222, a red laser control circuit 224, a blue laser control circuit 226, an optical system 230, and a screen 118.

Figure 22:
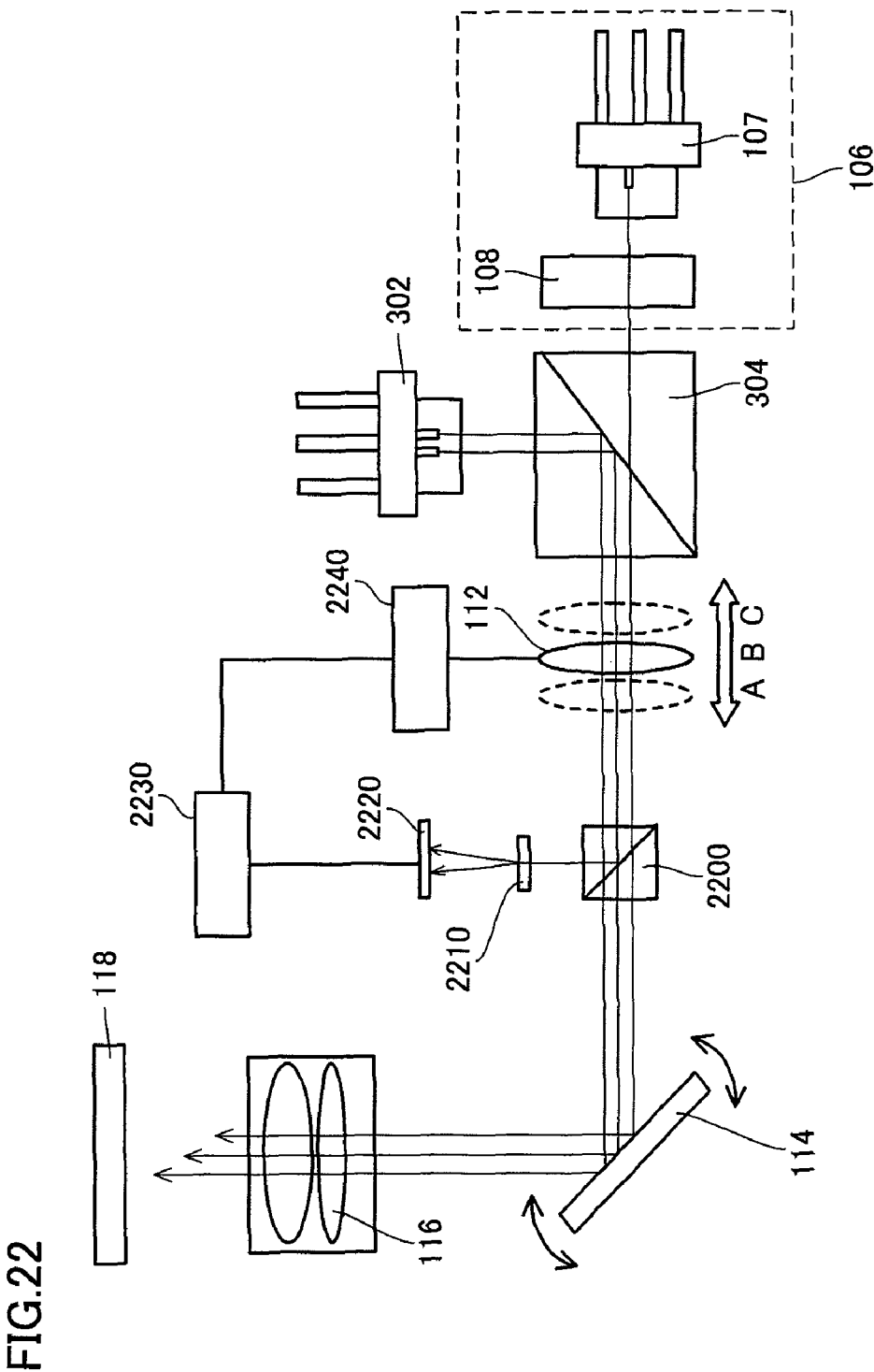
FIG. 22 is a diagram illustrating an optical system of a laser projector according to a third embodiment.

Then, optical system 230 will be described with reference to FIG. 22. FIG. 22 is a diagram illustrating the optical system of the laser projector in the third embodiment. As shown in FIG. 22, the laser projector includes a green laser 106, a two-wavelength laser 302, a PBS 304, a collimator lens 112, a two-axis galvanometer mirror 114, a group of lenses 116, and screen 118.

Green laser 106 emits a green laser beam. Two-wavelength laser 302 includes laser elements emitting laser beams of different two colors respectively that are contained in a single CAN package. In the present embodiment, two-wavelength laser 302 emits red and blue laser beams.

PBS 304 is placed at the position where respective optical paths of the laser beams emitted from respective lasers cross each other to cause these optical paths to coincide with each other. Two-wavelength laser 302 is positioned in the direction where the optical axis direction is rotated 90 degrees with respect to green laser 106. PBS 304 passes approximately 100% of the green laser beam, and reflects approximately 100% of the red laser beam and the blue laser beam. PBS 304 is an example of a synthesizing element causing a plurality of optical paths to coincide with each other, and a dichroic mirror or the like may be used instead of PBS 304.

In the present embodiment, green laser 106 is a combination of an infrared laser 107 and an SHG element 108. The green laser may be configured differently from the above-described one.

Further, a red (or blue) laser may be used instead of green laser 106, and a two-wavelength laser that is a combination of a blue (or red) laser and a green laser may be used. At the present time, however, it is difficult to configure the green laser in the form of a chip as compared with the red laser or blue laser and thus it is difficult to incorporate the green laser into the two-wavelength laser. Therefore, the configuration shown in the figure is desirable.

While the example where the two-wavelength laser is used is shown here, a red laser, a blue laser and two synthesizing elements may be used instead of the two-wavelength laser and one PBS.

Collimator lens 112 collimates the light transmitted through PBS 304 into parallel light. Two-axis galvanometer mirror 114 scans the light transmitted through collimator lens 112. The group of lenses 116 focuses the light reflected from the galvanometer mirror on screen 118.

The laser projector further includes a beam splitter 2200, a hologram element 2210, a detector 2220, a signal processing device 2230, and a moving device 2240. Beam splitter 2200 splits off a part of the light transmitted through collimator lens 112. For example, the beam splitter splits off a part of a laser beam of a certain wavelength. In this case, it is desirable to split off a part of a laser beam of any wavelength with a relatively larger output. Hologram element 2210 concentrates the light split off by beam splitter 2200. Detector 2220 detects the light transmitted through hologram element 2210 and outputs a signal according to a detected quantity of light. Signal processing device 2230 determines the state of convergence of the light split off by beam splitter 2200 based on the signal output from detector 2220. Moving device 2240 moves collimator lens 112, along the optical axis direction, between position A and position C shown in FIG. 22. Here, position B is the position where the light emitted from collimator lens 112 is made parallel.

Figure 23:
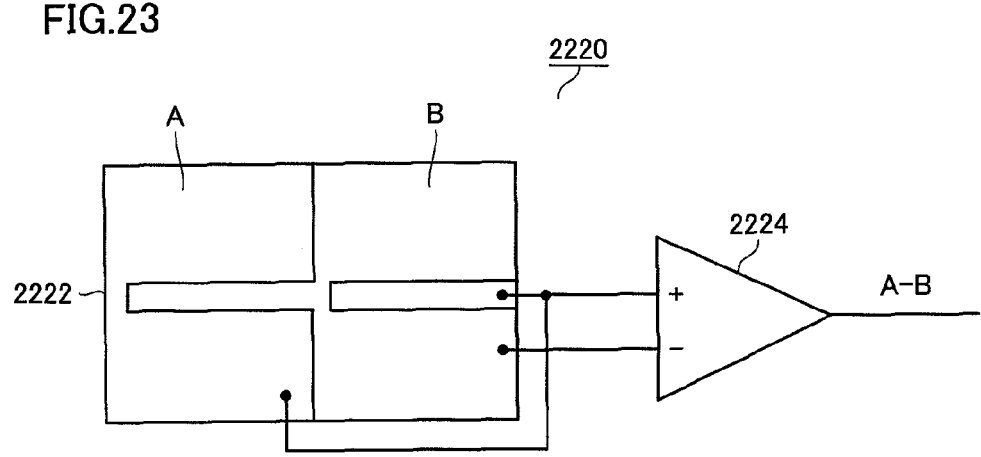
FIG. 23 is a diagram illustrating a configuration of a detector 2220.

Detector 2220 used in the present embodiment will be described with reference to FIG. 23. FIG. 23 is a diagram illustrating a configuration of detector 2220. As shown in FIG. 23, detector 2220 includes a detection surface 2222 formed of a detection area A and a detection area B, and a subtractor 2224.

Detection area A is a combination of the left-half area of detection surface 2222 except for a slit portion and a slit portion included in the right-half area of detection surface 2222. Detection area B is a portion of detection surface 2222 except for detection area A.

To subtractor 2224, signal A corresponding to the quantity of light detected in detection area A, and signal B corresponding to the quantity of light detected in detection area B are input. Subtractor 2224 calculates a difference between signal A and signal B and outputs the result of calculation A–B.

Detector 2220 as described above can be used in combination with hologram element 2210 to determine the state of convergence of the light split off by beam splitter 2200. This will be described with reference to FIGS. 24 to 27.

Figure 24:
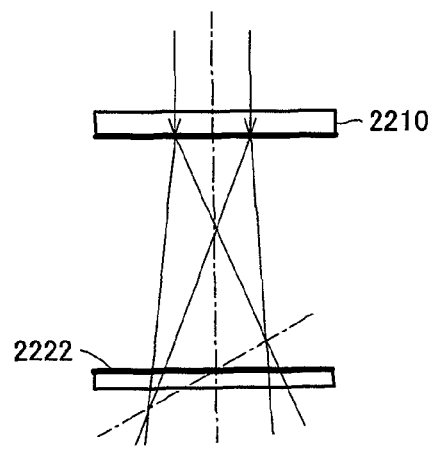
FIG. 24 is a diagram illustrating the lens effect of a hologram element 2210.
Figure 25:
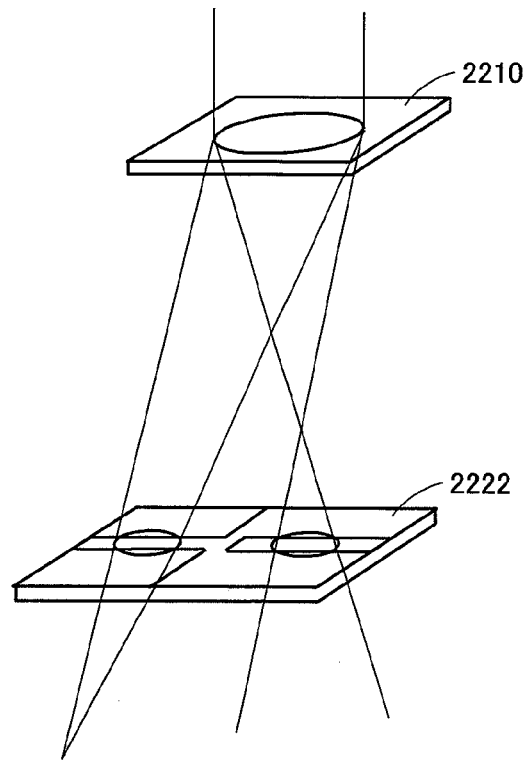
FIG. 25 is a schematic perspective view of a light-receiving system shown in FIG. 24.

FIG. 24 is a diagram illustrating the lens effect of hologram element 2210. Hologram element 2210 has a pattern with the lens effect that is made eccentric. As light enters hologram element 2210, ± first-order diffracted light comes out from hologram element 2210. FIG. 25 is a schematic perspective view of the light receiving system shown in FIG. 24.

Figure 26:
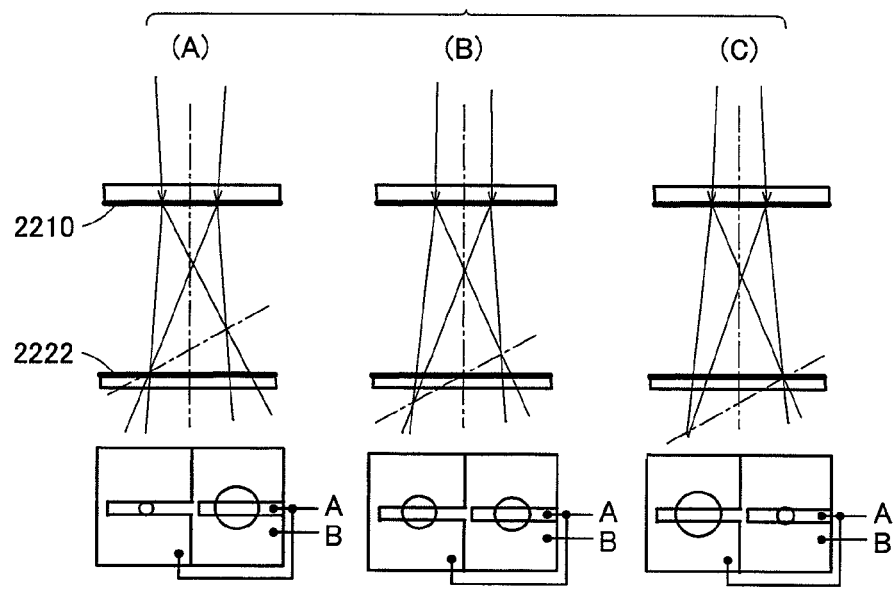
FIG. 26 is a diagram illustrating a variation of detected light according to the degree of collimation of light incident on a hologram.

FIG. 26 is a diagram illustrating a variation of detected light according to the degree of collimation of the light incident on the hologram. FIG. 26(A) to (C) each show the state of light incident on detection surface 2222 and the spread of the incident light on detection surface 2222 (hereinafter referred to as spot size) when collimator lens 112 is located at position A, position B or position C shown in FIG. 22. As shown in the figure, according to the degree of collimation of the incident light, respective spot sizes of the first-order diffracted light and the – first-order diffracted light change. These spot sizes increase/decrease in the directions opposite to each other with respect to a change of the degree of collimation. When collimator lens 112 is located at position A or position C and the incident light is not parallel light, the two spot sizes are considerably different from each other. As the incident light becomes close to parallel light, the difference in spot size decreases.

Figure 27:
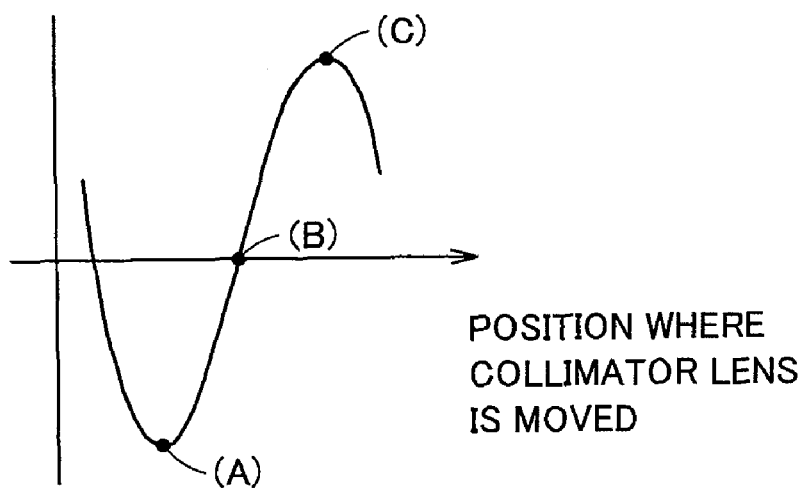
FIG. 27 is a diagram showing a signal that is output from detector 2220.

FIG. 27 is a diagram showing a signal that is output from detector 2220. As described in connection with FIG. 26, output (A–B) varies depending on the position where collimator lens 112 is moved. In FIG. 27, point (A), point (B) and point (C) correspond to respective cases where collimator lens 112 is at position A, position B and position C shown in FIG. 22. As shown in FIG. 27, the signal output draws an S-shaped curve, and the point where the graph crosses zero corresponds to the point where the beam transmitted through collimator lens 112 becomes parallel light. Therefore, when output A–B is negative, moving device 2240 moves collimator lens 112 in the direction from position A to position C so that output A–B becomes zero. In contrast, when output A–B is positive, moving device 2240 moves collimator lens 112 in the direction from position C to position A so that output A–B becomes zero.

The detection surface of detector 2220 may be the one designed to be able to detect a difference between the spot size of the first-order diffracted light and the spot size of the—first-order diffracted light, and the detection surface is not limited to the above-described one. For example, the detection surface may be slit-shaped detecting the light near the center of ± first-order diffracted light or, on the contrary, the detection surface may be the one detecting the light of the peripheral portion of ± first-order diffracted light, namely inverse-slit-shaped detection surface.

The operation of moving device 2240 is controlled according to the detection signal. Namely, the laser projector in the present embodiment includes a feedback mechanism for the detection signal. Therefore, the degree of collimation of the beam can be automatically maintained. Specifically, for example, signal processing device 2230 stores the output of detector 2220 at the time when the laser beam is adjusted to parallel light. Then, signal processing unit 2230 controls the operation of moving device 2240 based on a signal determined by subtracting, from the output of detector 2220, the output at the time the laser beam is parallel light as an offset.

Signal processing device 2230 may check the degree of collimation of the beam constantly or at certain time intervals. Further, signal processing device 2230 may check the degree of collimation of the beam when the laser projector is powered on. Alternatively, in the case where signal processing device 2230 includes a temperature sensor measuring the temperature in the projector, signal processing device 2230 may check the degree of collimation of the beam according to a change in temperature. For example, when the temperature in the projector becomes equal to or more than a predetermined temperature, or becomes equal to or less than the predetermined temperature, signal processing device 2230 may check the degree of collimation. In general, the wavelength and the degree of collimation of the laser beam vary according to a change in temperature. Therefore, the degree of collimation can be checked according to a temperature change to keep the degree of collimation of the laser beam.

As heretofore described, the laser projector in the present embodiment can automatically collimate the output light from the projector into parallel light of a very small diameter with high precision, by means of a simplified optical system.

The laser projector has been described as an example of the image display apparatus. As clearly seen from the foregoing description, however, the image display apparatus in the present embodiment may be the one as described below.

An image display apparatus operates for displaying an image on a projection surface by applying a laser beam to the projection surface. The image display apparatus includes a laser emitting a laser beam, a collimator lens converging the laser beam emitted from the laser, a beam splitter splitting off a part of the laser beam transmitted through the collimator lens, a hologram element on which a partial light incident and which generates first-order diffracted light and—first order diffracted light of the incident partial light, a detector detecting a difference between a spread of the first-order diffracted light and a spread of the—first-order diffracted light, a determination unit determining the state of convergence of the laser beam transmitted through the collimator lens, based on the difference, and a moving device adjusting the position of the collimator lens based on the result of the determination by the determination unit, so that the laser beam transmitted through the collimator lens becomes parallel light.

A detection surface of the detector may include a first area and a second area. The first area may be located around the center of the first-order diffracted light and may output a signal that is smaller as the first-order diffracted light spreads to a greater extent. The second area may be located around the—first-order diffracted right and may output a signal that is smaller as the—first-order diffracted light spreads to a greater extent. The detector may include a subtractor calculating the difference between the signal output from the first area and the signal output from the second area.

The detection surface of the detector may include a first area and a second area. The first area may be located around the first-order diffracted light, and may output a signal that is larger as the first-order diffracted light spreads to a greater extent. The second area may be located around the—first-order diffracted light, and may output a signal that is larger as the—first-order diffracted light spreads to a greater extent. The detector may include a subtractor calculating a difference between the signal output from the first area and the signal output from the second area.

The detection surface of the detector may include a first area and a second area. The first area may be formed of an area near the center of the first-order diffracted light and an area located around the—first-order diffracted light, output a signal that is smaller as the first-order diffracted light spreads to a greater extent, and output a signal that is larger as the—first-order diffracted light spreads to a greater extent. The second area is formed of an area near the center of the—first-order diffracted light and an area located around the first-order diffracted light, output a signal that is smaller as the—first-order diffracted light spreads to a greater extent, and output a signal that is larger as the first-order diffracted light spreads to a greater extent. The detector may include a subtractor calculating a difference between the signal output from the first area and the signal output from the second area.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image display apparatus for displaying an image on a projection surface by applying laser beams of three colors to said projection surface, comprising:
a single-wavelength laser emitting a laser beam of one color of said three colors;
a two-wavelength laser having laser elements respectively emitting laser beams of two colors of said three colors, the laser elements being contained in a single package;
a synthesizing element causing an optical path of said laser beam of one color and respective optical paths of said laser beams of two colors to coincide with each other; and
a scan device selectively applying said laser beams of three colors transmitted through said synthesizing element to said projection surface pixel by pixel of said image,
wherein the synthesizing element comprises a single surface that reflects almost all light from each of the laser elements of the two-wavelength laser, and that allows almost all light from the single-wavelength laser to pass through.

2. The image display apparatus according to claim 1, further comprising correction means for correcting color displacement on said projection surface.

3. The image display apparatus according to claim 2, wherein
said correction means includes a hologram element correcting displacement between respective optical paths of said laser beams of two colors due to a difference in light emission point of said two-wavelength laser.

4. The image display apparatus according to claim 2, wherein
said correction means includes a control unit controlling timing of emission of said laser beams of three colors such that said color displacement is corrected.

5. The image display apparatus according to claim 4, further comprising a detector detecting an amount of said color displacement, wherein
said control unit controls timing of emission of said laser beams of three colors based on said amount of the color displacement detected by said detector.

6. The image display apparatus according to claim 1, wherein
said two-wavelength laser emits a red laser beam and a blue laser beam, and
said single-wavelength laser emits a green laser beam.

7. The image display apparatus according to claim 6, wherein
said single-wavelength laser includes:
an infrared laser emitting an infrared laser beam; and
a second-harmonic generation element converting said infrared laser beam emitted from said infrared laser into said green laser beam.

8. The image display apparatus according to claim 1, wherein
said synthesizing element is a polarized beam splitter provided at a position where the optical path of said laser beam of one color and respective optical paths of said laser beams of two colors cross each other.

9. The image display apparatus according to claim 1, wherein
said scan device includes a scan element for applying said laser beams of three colors transmitted through said synthesizing element to said projection surface said pixel by pixel.

10. The image display apparatus according to claim 9, wherein
said scan element is a two-axis galvanometer mirror.

11. An image display apparatus for displaying an image on a projection surface by applying three laser beams of different colors to said projection surface, comprising:
a laser source emitting said three laser beams of different colors;
a synthesizing element causing respective optical paths of said laser beams of three colors to coincide with each other;
a scan device selectively applying said laser beams of three colors transmitted through said synthesizing element to said projection surface pixel by pixel of said image; and
a control unit controlling timing of emission of said laser beams of three colors by said laser source for correcting color displacement on said projection surface,
wherein the synthesizing element comprises a single surface that reflects almost all of two of the laser beams, and that allows almost all of the remaining laser beam of the three laser beams to pass through.

12. The image display apparatus according to claim 11, further comprising a detection unit detecting an amount of said color displacement, wherein
said control unit controls timing of emission of said laser beams of three colors based on said amount of the color displacement detected by said detection unit.

13. The image display apparatus according to claim 11, wherein said laser source includes:
a single-wavelength laser emitting a laser beam of one color of said three colors; and
a two-wavelength laser having laser elements respectively emitting laser beams of two colors of said three colors, said laser elements being contained in a single package.

\* \* \* \* \*